United States Patent
Kaushal et al.

(10) Patent No.: US 11,223,132 B2
(45) Date of Patent: Jan. 11, 2022

(54) ANTENNA DEVICE

(71) Applicant: Fujikura Ltd., Tokyo (JP)

(72) Inventors: Shailendra Kaushal, Sakura (JP); Ning Guan, Sakura (JP)

(73) Assignee: FUJIKURA LTD., Tokyo (JP)

( * ) Notice: Subject to any disclaimer, the term of this patent is extended or adjusted under 35 U.S.C. 154(b) by 122 days.

(21) Appl. No.: 16/647,947

(22) PCT Filed: Sep. 13, 2018

(86) PCT No.: PCT/JP2018/033997
§ 371 (c)(1),
(2) Date: Mar. 17, 2020

(87) PCT Pub. No.: WO2019/059092
PCT Pub. Date: Mar. 28, 2019

(65) Prior Publication Data
US 2020/0266543 A1 Aug. 20, 2020

(30) Foreign Application Priority Data

Sep. 21, 2017 (JP) .............................. JP2017-181340

(51) Int. Cl.
*H01Q 9/04* (2006.01)
*H01Q 21/06* (2006.01)
*H01Q 3/36* (2006.01)

(52) U.S. Cl.
CPC .............. *H01Q 9/0457* (2013.01); *H01Q 3/36* (2013.01); *H01Q 9/0421* (2013.01); *H01Q 21/065* (2013.01)

(58) Field of Classification Search
CPC ...... H01Q 9/0457; H01Q 3/36; H01Q 9/0421; H01Q 21/065; H01Q 13/206; H01Q 21/0075; H04B 7/06; H04B 7/08
See application file for complete search history.

(56) References Cited

U.S. PATENT DOCUMENTS

2008/0238793 A1\* 10/2008 Channabasappa ... H01Q 9/0457
343/767
2009/0128435 A1 5/2009 Jeng
(Continued)

FOREIGN PATENT DOCUMENTS

DE 10 2005 048 274 A1 4/2007
JP 3-55904 A 3/1991
(Continued)

OTHER PUBLICATIONS

International Search Report dated Nov. 13, 2018, issued in counterpad International Application No. PCT/JP2018/033997 (2 pages).

*Primary Examiner* — Dimary S Lopez Cruz
*Assistant Examiner* — Michael M Bouizza
(74) *Attorney, Agent, or Firm* — Westerman, Hattori, Daniels & Adrian, LLP

(57) ABSTRACT

An antenna device includes line-shaped feeding conductors arranged so as to face each patch antenna array and performing electromagnetic coupling feeding on each of the patch antennas, from a wiring-side feeding portions formed at a position intersecting a slot when viewed from the normal direction of a first surface. The patch antennas include an electrode which is arranged so as to face the wiring-side feeding portion, between two radiation elements arranged apart in the first direction, and is electromagnetically coupled from the wiring-side feeding portion. The electrode and each of the two radiation elements are electrically coupled in the first direction.

5 Claims, 13 Drawing Sheets

(56) References Cited

U.S. PATENT DOCUMENTS

| | | | | |
|---|---|---|---|---|
| 2013/0187830 | A1* | 7/2013 | Warnick | H01Q 21/065 343/893 |
| 2016/0380362 | A1 | 12/2016 | Cheng et al. | |
| 2020/0153116 | A1* | 5/2020 | Onaka | H01Q 23/00 |

FOREIGN PATENT DOCUMENTS

| | | |
|---|---|---|
| JP | 3-101507 A | 4/1991 |
| JP | H5-191132 A | 7/1993 |
| JP | 7-183724 A | 7/1995 |
| JP | 11-266118 A | 9/1999 |
| JP | 2004-200774 A | 7/2004 |
| JP | 2016-510531 A | 4/2016 |
| WO | 2008/064655 A1 | 6/2008 |

\* cited by examiner

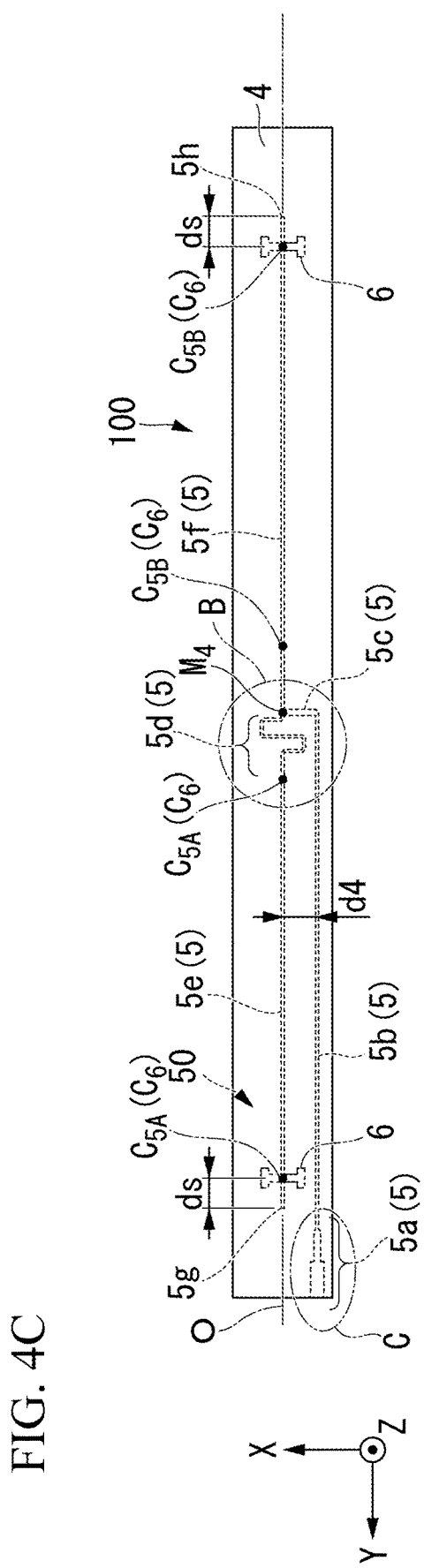

ANTENNA DEVICE

TECHNICAL FIELD

Cross-Reference to Related Applications

This application is a National Stage Application, filed under 35 U.S.C. § 371, of International Application No. PCT/JP2018/033997, filed on Sep. 13, 2018, which claims priority to Japanese Patent Application No. 2017-181340, filed on Sep. 21, 2017, which are incorporated by reference herein in their entirety.

The present invention relates to an antenna device.

BACKGROUND ART

In the field of high-speed wireless communication, antenna devices including rectangular planar antennas of an electromagnetic coupling feeding system so as to be capable of beam forming are known.

For example, Patent Document 1 describes a transmission power control device for wireless communication including a multi-element phased antenna array that forms a directional beam, directivity of which is controllable.

PRIOR ART DOCUMENTS

Patent Documents

Patent Document 1

Published Japanese Translation No. 2016-510531 of the PCT International Publication

DISCLOSURE OF INVENTION

Problems to be Solved by the Invention

However, in beam forming by a multi-element phased antenna array as in the technology described in Patent Document 1, the maximum gain value varies according to the cosine law depending on the radiation angle. That is, the maximum radiation gain is obtained at a radiation angle of 0 degrees, and the maximum gain value decreases as the absolute value of the radiation angle increases. For this reason, in an antenna device that performs beam forming (hereinafter referred to as a beam forming antenna device), it is important to make the maximum radiation gain as large as possible in order to perform good wireless communication.

For example, in a beam forming antenna device, a plurality of patch antennas are arrayed in a lattice pattern, and patch antennas arranged in a column direction are collectively fed by a feeding line. By changing the feeding phase in each column, the radiation angle in a direction perpendicular to each column is controlled.

At this time, since a feeding line in each column has the conductor impedance, the gain decreases due to a conductor loss.

In order to reduce the conductor loss, reducing the conductor impedance can be considered. However, as the conductor width increases, the device size increases.

Moreover, it is necessary to set the pitch of feeding points on each feeding line and the size of each patch antenna to appropriate values based on a design wavelength determined by a frequency band used for communication. Also in this respect, miniaturization is difficult.

The present invention has been made in view of the above disadvantages, and provides an antenna device that enables high gain suitable for beam forming and reduction of size.

Means for Solving the Problems

A first aspect of the present invention is an antenna device including: a first dielectric layer; an antenna array arranged on a first surface of the first dielectric layer, the antenna array including a plurality of patch antenna arrays arrayed in a direction intersecting a first direction, the plurality of patch antenna arrays each including a plurality of patch antennas arranged in alignment in the first direction; a ground conductor plate arranged on a second surface opposite to the first surface in the first dielectric layer, the ground conductor plate formed with slots forming non-conductive portions at positions facing the patch antennas; a second dielectric layer secured to the ground conductor plate so as to face the first dielectric layer with the ground conductor plate sandwiched therebetween; and line-shaped feeding conductors which perform electromagnetic coupling feeding on each of the patch antennas in the patch antenna arrays from wiring-side feeding portions formed at positions intersecting with each of the slots when viewed from a normal direction of the first surface, the feeding conductors formed on the second dielectric layer so as to face the ground conductor plate with the second dielectric layer sandwiched therebetween and each arranged to face one of the patch antenna arrays, in which each of the patch antennas includes: two radiation elements spaced apart from each other in the first direction; an electrode arranged so as to face the wiring-side feeding portion between the two radiation elements, the electrode enabling electromagnetic coupling feeding from the wiring-side feeding portion; and wiring which electrically couples the electrode and each of the two radiation elements in the first direction.

According to a second aspect of the present invention, in the antenna device according to the first aspect, the feeding conductor may include: first feeding wiring extending in a first feeding direction in the first direction from a center of the patch antenna array in the first direction when viewed from the normal direction; second feeding wiring connected to a first base end of the first feeding wiring, the second feeding wiring extending in a direction opposite to the first feeding wiring from the first base end of the first feeding wiring; third feeding wiring that is electrically coupled to a connection portion of the first feeding wiring and the second feeding wiring, the third feeding wiring arranged in parallel with the first feeding wiring or the second feeding wiring; and a phase adjuster which forms a phase difference of 180 degrees between a phase of each of the wiring-side feeding portions in the first feeding wiring and a phase of each of the wiring-side feeding portions in the second feeding wiring, the phase adjuster formed between the connection portion and the wiring-side feeding portion located closest to the first base end of the first feeding wiring or a second base end of the second feeding wiring.

According to a third aspect of the present invention, in the antenna device according to the second aspect, the phase adjuster may be formed in a waveform pattern centered on a central axis of the first feeding wiring or the second feeding wiring in which the phase adjuster is formed.

According to a fourth aspect of the present invention, in the antenna device according to the second or third aspect, the third feeding wiring may include an impedance matcher in which a line width is increased by two or more stages toward a terminal end at an end in a longitudinal direction.

According to a fifth aspect of the present invention, in the antenna device according to the fourth aspect, in the impedance matcher, a change in impedance between adjacent stages may be less than or equal to 50Ω, and a change in impedance of a widening stage closest to the terminal end may be less than or equal to 30Ω.

Effects of the Invention

According to an antenna device of an aspect of the present invention, high gain suitable for beam forming can be obtained, and the size can be reduced.

BRIEF DESCRIPTION OF THE DRAWINGS

FIG. 4C is a schematic plan view illustrating an exemplary feeding conductor of the antenna device of the present embodiment.

EMBODIMENTS FOR CARRYING OUT THE INVENTION

Hereinafter, an antenna device according to an embodiment of the present invention will be described with reference to the drawings.

Figure 1:
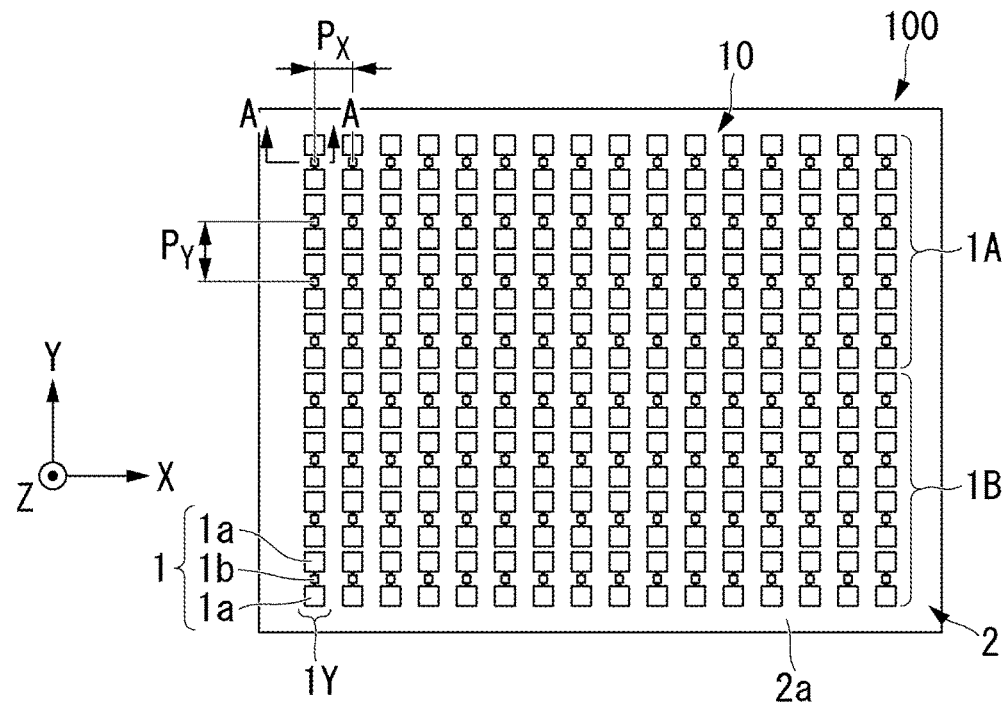
FIG. 1 is a schematic plan view illustrating an example of an antenna device of the present embodiment.
Figure 2:
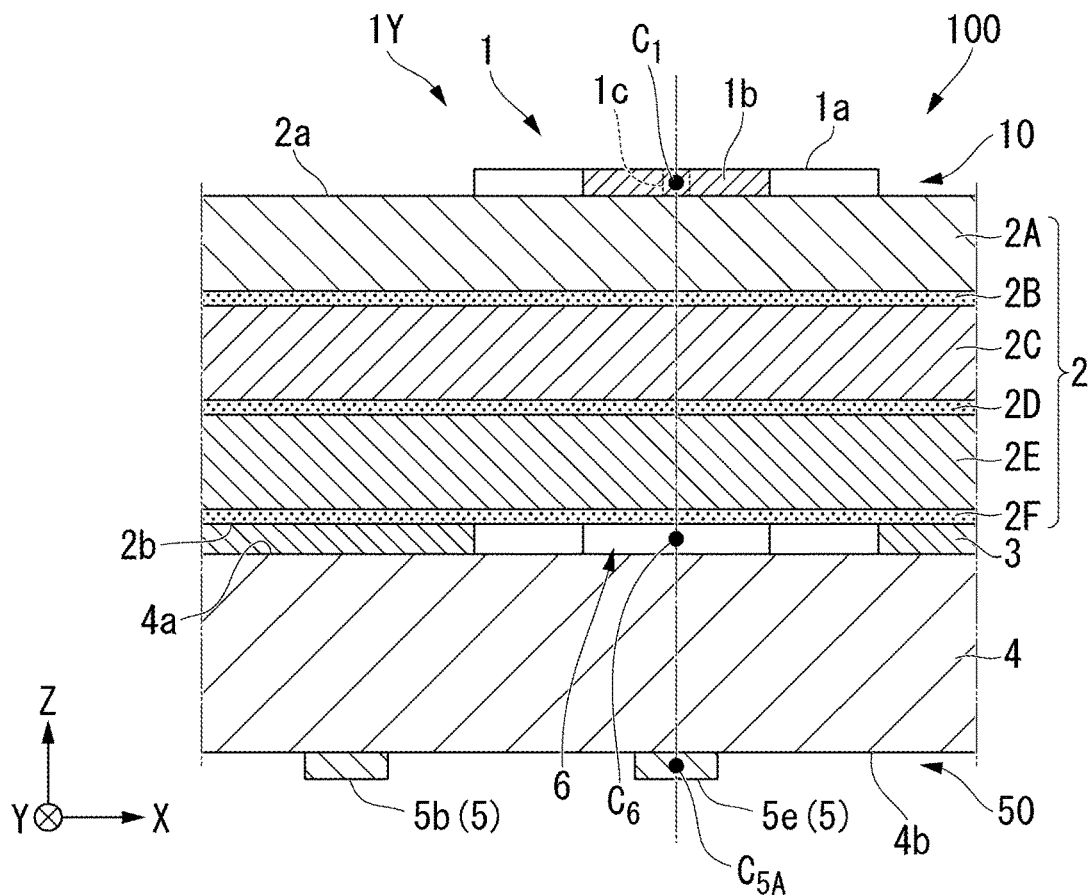
FIG. 2 is a cross-sectional view taken along a line A-A in FIG. 1.
Figure 3:
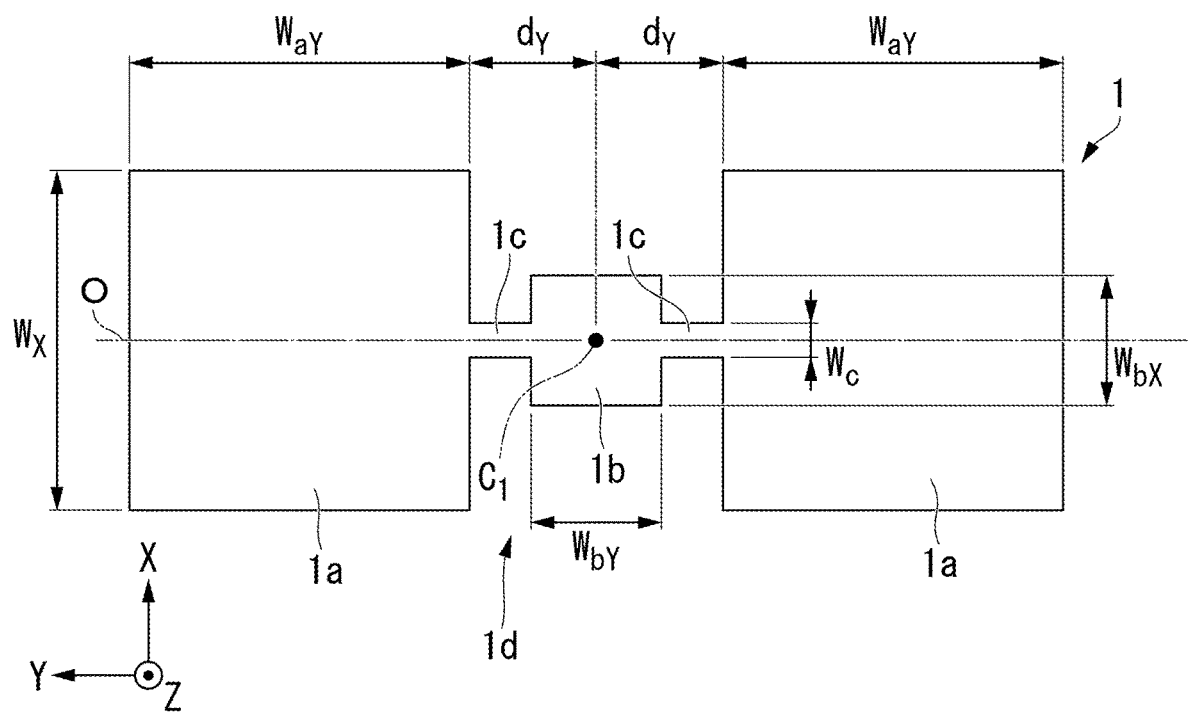
FIG. 3 is a schematic plan view illustrating an exemplary patch antenna of the antenna device of the present embodiment.
Figure 4A:
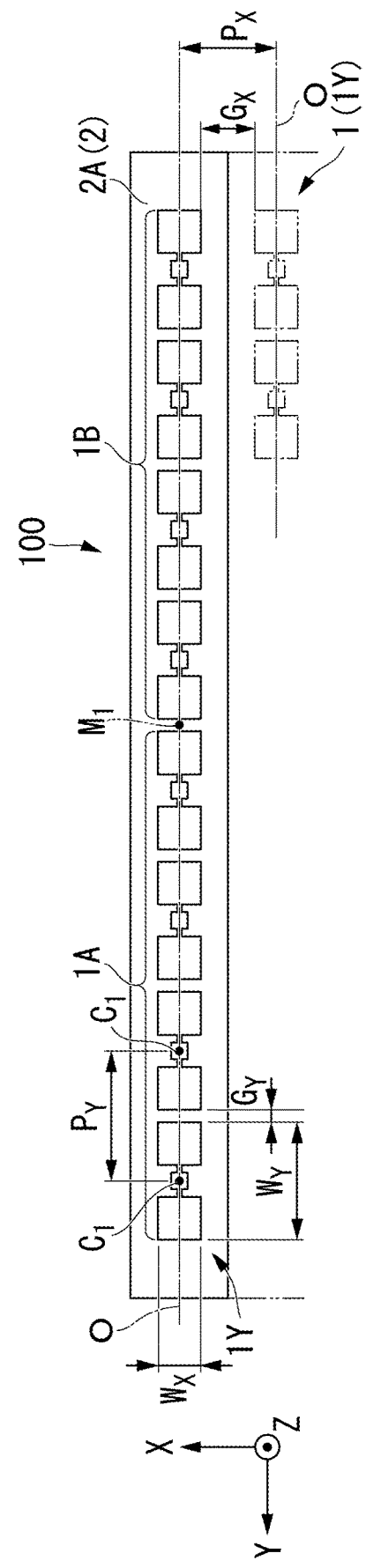
FIG. 4A is a schematic plan view illustrating an exemplary patch antenna array of the antenna device of the present embodiment.
Figure 4B:
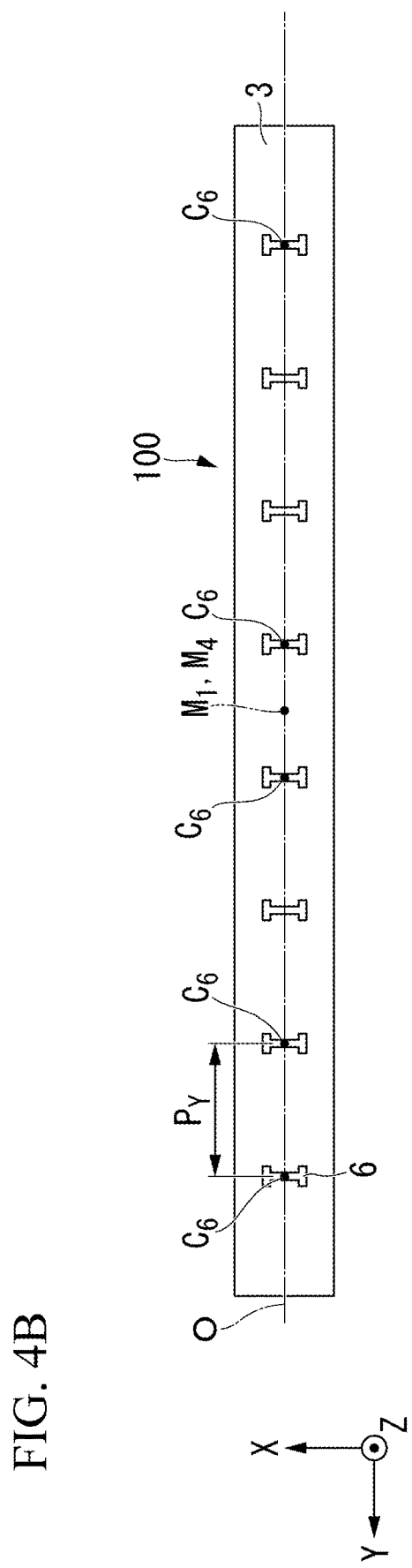
FIG. 4B is a schematic plan view illustrating an exemplary ground conductor plate of the antenna device of the present embodiment.
Figure 5:
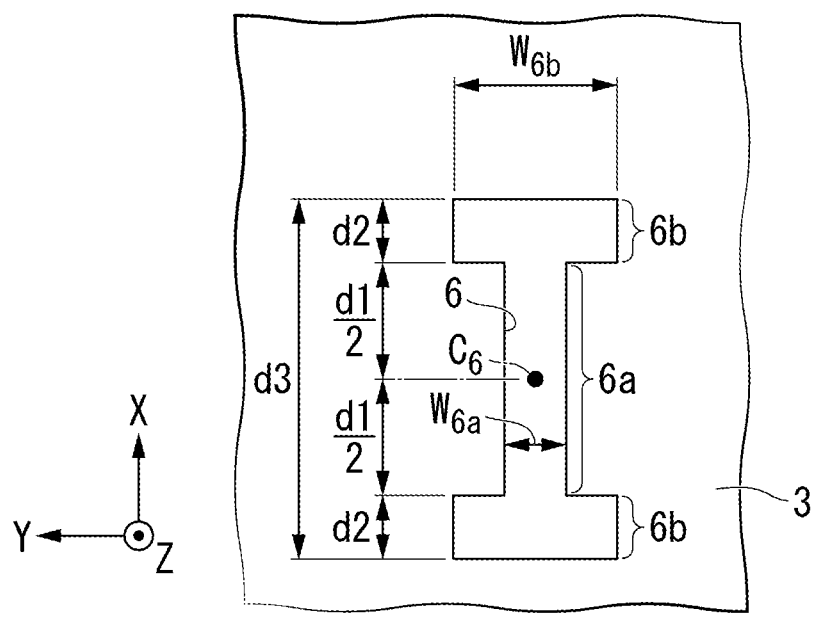
FIG. 5 is a schematic plan view illustrating an exemplary opening shape of a slot used in the antenna device of the present embodiment.
Figure 6A:
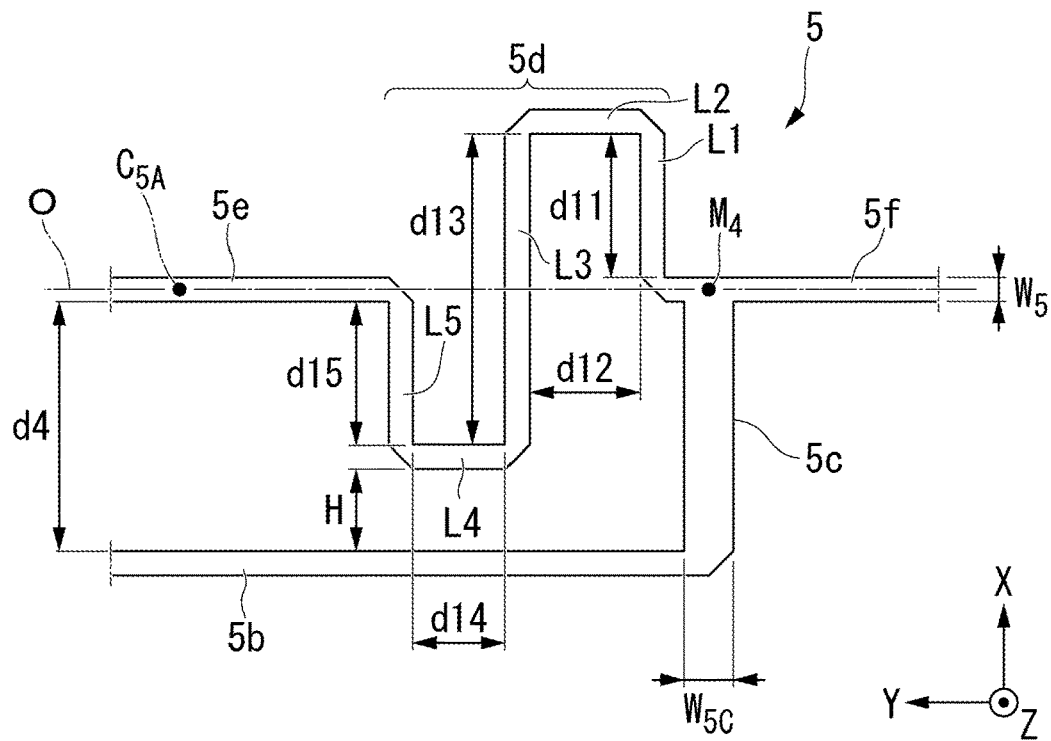
FIG. 6A is an enlarged view of the feeding conductor in a portion B in FIG. 4C.
Figure 6B:
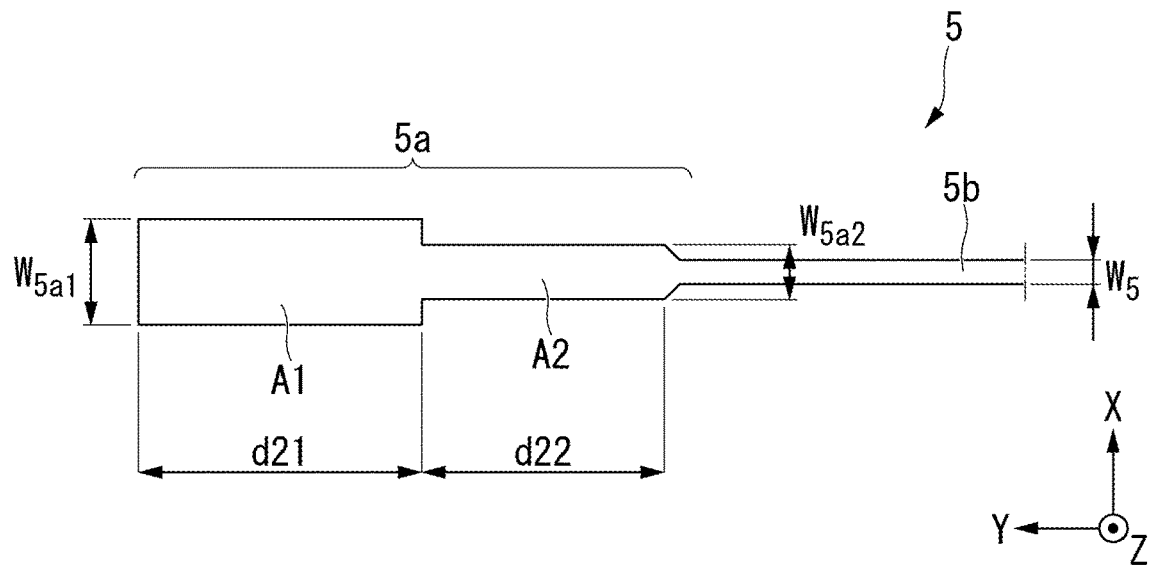
FIG. 6B is an enlarged view of the feeding conductor in a portion C in FIG. 4C.

FIG. 1 is a schematic plan view illustrating an example of an antenna device of the present embodiment. FIG. 2 is a cross-sectional view taken along a line A-A in FIG. 1. FIG. 3 is a schematic plan view illustrating an exemplary patch antenna of the antenna device of the present embodiment. FIGS. 4A to 4C are schematic plan views illustrating examples of a patch antenna array, a ground conductor plate, and a feeding conductor, respectively, of the antenna device according to the present embodiment. FIG. 5 is a schematic plan view illustrating an exemplary opening shape of a slot used in the antenna device of the present embodiment. FIG. 6A is an enlarged view of the feeding conductor in a portion B in FIG. 4C. FIG. 6B is an enlarged view of the feeding conductor in a portion C in FIG. 4C.

The drawings are schematic diagrams in which dimensions or shapes are exaggerated or simplified (the same applies to other drawings below).

An antenna device 100 of the present embodiment illustrated in FIG. 1 includes planar antennas of an electromagnetic coupling feeding system. For example, the antenna device 100 is a phased array antenna capable of beam forming.

The antenna device 100 can be used as an antenna device in communication in the field of Internet of things (IoT) or high-speed wireless communication such as wireless gigabit (WiGig).

As illustrated in FIG. 2, the antenna device 100 includes patch antennas 1, a first dielectric layer 2, a ground conductor plate 3, a second dielectric layer 4, and a feeding conductor layer 50 that are stacked in the order mentioned.

Hereinafter, the stacking direction is defined as a Z-axis direction, and two axial directions perpendicular to the Z-axis direction and perpendicular to each other are referred to as an X-axis direction (second direction) and a Y-axis direction (first direction). The coordinate system here is a right-handed system. Viewing in the Z-axis direction may also be referred to as a plan view.

As illustrated in FIG. 1, the patch antennas 1 are patterned on a first surface 2a (first surface) of the first dielectric layer 2 to be described later on the basis of a predetermined array pattern. The normal directions of the patch antennas 1 and the first surface 2a are the Z-axis direction.

The patch antennas 1 are a planar antenna that is electromagnetically coupled and fed from a feeding conductor 5 (see FIG. 2) that will be described later. In the present embodiment, as an example, the plurality of patch antennas 1 are arrayed in a rectangular lattice pattern arranged in the X-axis direction and the Y-axis direction to form an antenna array 10. In the example illustrated in FIG. 1, the antenna array 10 includes a total of 128 patch antennas 1 in which eight patch antennas are arranged in the Y-axis direction and sixteen patch antennas are arranged in the X-axis direction. The array pitch of the patch antennas 1 in the X-axis direction is $P_X$, and the array pitch in the Y-axis direction is $P_Y$.

The array pitch $P_Y$ is equal to an interval between feeding points that will be described later. The array pitch $P_Y$ is set to an appropriate value so that directions of currents flowing through two radiation elements $1a$ in a patch antenna $1$ are aligned using characteristics at the time when electromagnetic induction is performed. In the present embodiment, the array pitch $P_Y$ is matched to 0.8 times the wavelength of a designed communication wave.

The eight patch antennas $1$ arrayed in the Y-axis direction form a patch antenna array $1Y$. Each patch antenna array $1Y$ can be fed by electromagnetic coupling from one line of feeding conductor $5$ (see FIG. 2) in the feeding conductor layer $50$ (see FIG. 2) that will be described later.

As illustrated in FIG. 3, in the present embodiment as an example, each of the patch antennas $1$ includes two radiation elements $1a$ arranged in the Y-axis direction and a divided circuit pattern $1d$ which is a divider for arraying the radiation elements $1a$.

Each of the radiation elements $1a$ is formed into a rectangular shape having sides extending in each of the X-axis direction and the Y-axis direction. The radiation elements $1a$ are arrayed in the Y-axis direction with a gap of $2 \times d_Y$.

The width of each of the radiation elements $1a$ in the Y-axis direction is $W_{aY}$, and the width in the X-axis direction is $W_X$ (where $0 < W_X < P_X$). The center (centroid) of each of the radiation elements $1a$ is on an axis O extending in the Y-axis direction.

The divided circuit pattern $1d$ includes an electrode $1b$ for electromagnetic coupling and two pieces of wiring $1c$ for electrically coupling the electrode $1b$ and the radiation elements $1a$ to each other.

The electrode $1b$ is formed into a rectangular shape having sides extending in each of the X-axis direction and the Y-axis direction. The width of the electrode $1b$ in the Y-axis direction is $W_{bY}$ (where $0 < W_{bY} < 2 \times d_Y$), and the width in the X-axis direction is $W_{bX}$ (where $0 < W_{bX} < W_X$).

The center (centroid) of the electrode $1b$ is arranged on the axis O and is arranged at equal distances from the centers of the radiation elements $1a$.

Each piece of the wiring $1c$ is line-shaped wiring having the axis O as the central axis thereof, and electrically couples a radiation element $1a$ and the electrode $1b$ to each other. The line width (width in the X-axis direction) of each piece of the wiring $1c$ is denoted by $W_c$ ($0 < W_c < W_{bX}$). The wiring lengths of the respective pieces of wiring $1c$ are equal at $d_Y - W_{bY}/2$.

With such a configuration, each of the patch antennas $1$ is formed in a rectangular area having a width in the X-axis direction of $W_X$ and a width in the Y-axis direction of $W_Y = 2 \times (W_{aY} + d_Y)$ (where $0 < W_Y < P_Y$). A point $C_1$, which is the center of the rectangular area of $W_X \times W_Y$ where the patch antenna $1$ is formed, coincides with the center of the electrode $1b$. As will be described later, the vicinity of the point $C_1$ is an antenna-side feeding portion in the patch antenna $1$. Hereinafter, the point $C_1$ may be referred to as an antenna-side feeding point.

For example in a case where a designed communication frequency of the antenna device $100$ is 60 GHz, the following numerical examples are suitable as the dimensions of the respective components described above. Hereinafter, numerical examples relating to other members correspond to the following numerical examples of the antenna array $10$ unless otherwise specified.

The array pitches of a patch antenna $1$, $P_Y$ and $P_X$, are 4 mm and 4 mm, respectively. The value $P_Y=4$ (mm) is obtained by multiplying a wavelength of 5 mm, for the communication frequency of 60 GHz, by 0.8.

The width dimensions of a radiation element $1a$, $W_X$ and $W_{aY}$, are 1.33 mm and 1.33 mm, respectively. The length $d_Y$ is 0.205 mm.

The width dimensions of an electrode $1b$, $W_{bX}$ and $W_{bY}$, are 0.5 mm and 0.6 mm, respectively.

The line width $W_c$ of the wiring $1c$ is 0.13 mm.

In such a numerical example, a patch antenna $1$ is formed within a rectangular area having a width in the X-axis direction of 1.33 mm and a width in the Y-axis direction of 3.57 mm.

As illustrated in FIG. 4A, a gap $G_Y$ in the Y-axis direction between patch antennas $1$ is 0.43 mm (=4 mm−3.57 mm). A gap $G_X$ in the X-axis direction between patch antenna arrays $1Y$ is 0.38 mm.

The patch antennas $1$ are made of a metal material such as copper.

In a patch antenna $1$, impedances from a point $C_1$ to respective radiation elements $1a$ are set in such a manner that current directions in the respective radiation elements $1a$ become substantially the same. In the present embodiment, the overall current direction in each of the radiation elements $1a$ becomes the same in the Y-axis direction.

As illustrated in FIG. 2, the first dielectric layer $2$ is a flat plate member whose dielectric constant and layer thickness are defined depending on required radiation characteristics. The first dielectric layer $2$ may be a single-layer dielectric or a plurality of dielectrics bonded together. Whether to use a single layer or a plurality of layers may be determined in consideration of the cost of materials, for example.

In the example illustrated in FIG. 2, an example is illustrated in which dielectrics $2A$, $2C$, and $2E$ each having an appropriate layer thickness and relative dielectric constant are joined by resin adhesive layers $2B$ and $2D$ that are dielectrics in the first dielectric layer $2$. A second surface $2b$ (second surface), which is the surface opposite to the first surface $2a$ in the first dielectric layer $2$, is formed by a resin adhesive layer $2F$. The resin adhesive layer $2F$ forming the second surface $2b$ joins the ground conductor plate $3$ that will be described later.

In the case where the first dielectric layer $2$ includes a plurality of layers in this manner, it becomes easier to change the dielectric constant and the layer thickness of the first dielectric layer $2$. Therefore, it becomes even easier to set the impedance of each component to a predetermined value together with the conductor shape in each component of the patch antennas $1$.

Since the thickness of the first dielectric layer $2$ is related to the impedance of the electromagnetic coupling feeding portion, it is important that the thickness be accurately matched to an appropriate thickness.

For example, in the case where the relative dielectric constant of the first dielectric layer $2$ is 2.2, the layer thickness is more preferably 0.1 mm.

As illustrated in FIG. 2, the ground conductor plate $3$ is a plate-like member made of a conductor in which slots $6$ are formed at positions facing the electrodes $1b$ of the patch antennas $1$. The ground conductor plate $3$ is grounded.

The ground conductor plate $3$ is secured to the first dielectric layer $2$ via a resin adhesive layer $2F$ forming the second surface $2b$.

The slots $6$ are non-conductive portions in the ground conductor plate $3$. As illustrated in FIG. 4B, a slot $6$ extends in the X-axis direction. The opening shape of the slot $6$ enables impedance matching between the impedance of a patch antenna 1 and the impedance of a feeding conductor 5 that will be described later.

A slot 6 in the present embodiment opens in an H-shape in a plan view. Specifically, as illustrated in FIG. 5, the slot 6 includes a rectangular first opening 6a that is long in the X-axis direction and second openings 6b each extending in the Y-axis direction at both longitudinal ends of the first opening 6a. The first opening 6a forms a signal passing portion through which a signal passes. The second openings 6b each increase the impedance at both ends of the signal passing portion.

As illustrated in FIG. 2, a point $C_6$ that is the center (centroid) of the slot 6 is arranged so as to overlap with the point $C_1$ that is the center (centroid) of the electrode 1b in the patch antenna 1 when viewed from the Z-axis direction. Therefore, the slot 6 includes the point $C_1$ and crosses the electrode 1b in the X-axis direction in a plan view.

As illustrated in FIG. 4B, for example, center points (points $C_6$) in slots 6 formed to correspond to each of the patch antennas 1 of the patch antenna array 1Y are aligned on the axis O of the patch antenna array 1Y at equal intervals at the pitch $P_Y$ in a plan view.

As illustrated in FIG. 5, it is more preferable for a length d3 of the slot 6 in the longitudinal direction (X-axis direction) to be matched to a dimension in such a manner that the matching impedance has the same value. For example, d3 may be 1.35 mm.

The first opening 6a opens in a rectangular shape having a width of $W_{6a}$ in the Y-axis direction that is the lateral direction and a length of d1 (where $d1>W_{bx}$) in the X-axis direction that is the longitudinal direction.

It is more preferable that the width $W_{6a}$ of the first opening 6a in the lateral direction be set to 0.3 mm in order to set the coupling impedance at 200Ω, for example.

Each of the second openings 6b is formed into an appropriate form widened from the width $W_{6a}$ in the lateral direction of the first opening 6a in order to form an impedance larger than the coupling impedance by the first opening 6a.

In the example illustrated in FIG. 5, each of the second openings 6b opens in a rectangular shape having a length of d2 in the X-axis direction and a width of $W_{6b}$ in the Y-axis direction (where $W_{6b}>W_{6a}$).

For example, in the second opening 6b, d2 and $W_{6b}$ may be 0.3 mm and 0.6 mm, respectively. In this case, the length d1 of a first opening 6a is 0.75 mm (=1.35 mm−2×0.3 mm).

In the case of the more preferable numerical example of the dimension of the slot 6 described above, the coupling impedance of the electromagnetic coupling feeding portion at the position of the point $C_6$ in a plan view can be set to 112Ω.

As illustrated in FIG. 2, the second dielectric layer 4 is provided to separate the ground conductor plate 3 and the feeding conductors 5 that will be described later by a certain insulation distance so that electromagnetic coupling feeding can be performed from the feeding conductors 5 that will be described later to the patch antennas 1 through the slots 6.

Therefore, the ground conductor plate 3 is arranged on a first surface 4a of the second dielectric layer 4, and the feeding conductors 5 that will be described later are arranged on a second surface 4b of the second dielectric layer 4.

In order to improve the feeding efficiency, it is preferable that the relative dielectric constant $\varepsilon_r$ of the second dielectric layer 4 be as small as possible. For example, the relative dielectric constant $\varepsilon_r$ of the second dielectric layer 4 is more preferably within a range of 1 to 2.5.

For example, in the case where the relative dielectric constant $\varepsilon_r$ of the second dielectric layer 4 is 2.2, the thickness of the second dielectric layer 4 is more preferably 130 μm.

As illustrated in the partial cross section in FIG. 2, the feeding conductor layer 50 is patterned on the second surface 4b of the second dielectric layer 4. The feeding conductor layer 50 includes the same number of feeding conductors 5, extending in the Y-axis direction corresponding to the patch antenna arrays 1Y, as the number of patch antenna arrays 1Y in the antenna array 10.

Since the shapes of the feeding conductors 5 are all the same, the following description will be given by taking a feeding conductor 5 illustrated in FIG. 4C drawn to correspond to the one patch antenna array 1Y illustrated in FIG. 4A as an example.

The feeding conductor 5 performs electromagnetic coupling feeding to each patch antenna 1 by dividing the patch antennas 1 included in the patch antenna array 1Y into a first antenna group 1A and a second antenna group 1B. The first antenna group 1A includes half of the patch antennas 1 in the patch antenna array 1Y arranged on the Y-axis positive direction side. The second antenna group 1B includes half of the patch antennas 1 in the patch antenna array 1Y arranged on the Y-axis negative direction side.

The feeding conductor 5 can be electrically coupled to an external circuit (not illustrated) via a connection path having a predetermined impedance. As an exemplary connection path with the external circuit (not illustrated), for example, a coaxial cable having an impedance of 50Ω can be cited.

In the present embodiment, a feeding conductor 5 includes first feeding wiring 5e, second feeding wiring 5f, and third feeding wiring 5b.

The first feeding wiring 5e performs electromagnetic coupling feeding on each of the patch antennas 1 of the first antenna group 1A.

The first feeding wiring 5e extends substantially linearly along the axis O from a point $M_4$ in the drawing to a tip 5g in the Y-axis positive direction (first feeding direction) in a plan view. The point $M_4$ is a point on the second surface 4b that faces, in the Z-axis direction, the point $M_1$ (see FIG. 4A) that is the center (centroid) in the X-axis direction and the Y-axis direction in the patch antenna array 1Y.

Specifically, the first feeding wiring 5e is formed in a straight line shape extending on the axis O except for a phase adjuster 5d that will be described later formed at the end in the Y-axis negative direction near the point $M_4$ in a plan view. The axis O in a plan view is the central axis of the first feeding wiring 5e excluding the phase adjuster 5d. In the present description, the central axis of the first feeding wiring 5e excluding the phase adjuster 5d is simply referred to as the central axis of the first feeding wiring 5e.

The tip of the first feeding wiring 5e intersects with the slot 6 (the leftmost slot 6 in FIG. 4B) farthest in the Y-axis positive direction among the slots 6 facing the first antenna group 1A and protrudes from the slot 6 in the Y-axis positive direction in a plan view. The protruding amount of the tip 5g of the first feeding wiring 5e from the slot 6 is denoted by ds. The protruding amount ds is determined so that the coupling impedance between the first feeding wiring 5e farthest in the Y-axis positive direction side in the first antenna group 1A and the electrode 1b becomes appropriate.

The phase adjuster 5d is formed between the slot 6 closest to the base end side among the slots 6 overlapping the first feeding wiring 5e and the point $M_4$ in a plan view. Thus, the four slots 6 that overlap the patch antennas 1 of the first antenna group 1A in a plan view intersect the straight line portion in the first feeding wiring 5e excluding the phase adjuster 5d (hereinafter referred to as the main body of the first feeding wiring 5e). The portions of the main body of the first feeding wiring 5e that overlap with the slots 6 each form a wiring-side feeding portion in the first feeding wiring 5e. Hereinafter, in the wiring-side feeding portions in the first feeding wiring 5e, a point $C_{5A}$ that overlaps the points $C_1$ and $C_6$ in a plan view may be referred to as a wiring-side feeding point in the first feeding wiring 5e.

The second feeding wiring 5f performs electromagnetic coupling feeding on each of the patch antennas 1 of the second antenna group 1B.

The second feeding wiring 5f is formed in a straight line shape extending on the axis O from the point $M_4$ to a tip 5h in the Y-axis negative direction (second feeding direction) in a plan view. The axis O in a plan view is the central axis of the second feeding wiring 5f.

The tip of the second feeding wiring 5f intersects with the slot 6 (the rightmost slot 6 in FIG. 4B) farthest in the Y-axis negative direction among the slots 6 facing the second antenna group 1B and protrudes from the slot 6 in the Y-axis negative direction in a plan view. The protruding amount of the tip 5h of the second feeding wiring 5f from the slot 6 is denoted by ds like in the case of the first feeding wiring 5e.

Thus, the distances from the point $M_4$ to the tips 5g and 5h are equal to each other in the feeding conductor 5.

The four slots 6 that overlap the patch antennas 1 of the second antenna group 1B in a plan view intersect with the second feeding wiring 5f. The portions of the second feeding wiring 5f that overlap with the slots 6 each form a wiring-side feeding portion. Hereinafter, in the wiring-side feeding portions in the second feeding wiring 5f, a point $C_{5B}$ that overlaps the points $C_1$ and $C_6$ in a plan view may be referred to as a wiring-side feeding point in the second feeding wiring 5f.

The third feeding wiring 5b feeds a signal current supplied from an external circuit (not illustrated) to the first feeding wiring 5e and the second feeding wiring 5f.

The third feeding wiring 5b extends linearly in the Y-axis direction in parallel with the first feeding wiring 5e from the base end of the second dielectric layer 4 on the Y-axis positive direction side with the tip bent in the X-axis positive direction at a position facing the point $M_4$. The tip of the third feeding wiring 5b is arranged at a position facing the point $M_4$ in the X-axis direction, and is electrically coupled to each of the base ends (connection portions) of the first feeding wiring 5e and the second feeding wiring 5f via an impedance matcher 5c that will be described later.

Therefore, when viewed from the third feeding wiring 5b, the first feeding wiring 5e and the second feeding wiring 5f are substantially T-shaped branch lines in which a signal current bifurcates in the Y-axis positive direction and the Y-axis negative direction. The point $M_4$ is a branch point of the wiring path.

Since the third feeding wiring 5b is arranged in parallel with the first feeding wiring 5e, the current directions of the signal currents flowing therethrough are opposite to each other. Therefore, if the third feeding wiring 5b is too close to the first feeding wiring 5e, the feeding efficiency of electromagnetic coupling feeding in the first feeding wiring 5e decreases. Thus, in the present embodiment, the third feeding wiring 5b parallel to the first feeding wiring 5e is separated by a distance d4.

As illustrated in detail in FIG. 6A, the phase adjuster 5d is provided at the base end of the first feeding wiring 5e. The phase adjuster 5d forms a phase difference of 180 degrees between the phase of each of the wiring-side feeding portions in the first feeding wiring 5e and the phase of each of the wiring-side feeding portions in the second feeding wiring 5f.

In the present embodiment, the phase adjuster 5d has a waveform shape as a whole in which a wire having the same line width as that of the main body of the first feeding wiring 5e is bent in the X-axis direction. The shape of the waveform is not particularly limited; however in the example illustrated in FIG. 6A, it is a rectangular waveform. The line width of the main body of the first feeding wiring 5e and the phase adjuster 5d is $W_5$.

The wiring length of the phase adjuster 5d is determined so as to be longer than the linear distance from the point $M_4$ to a feeding point $C_{5A}$ closest to the base end of the first feeding wiring 5e by half the design communication wavelength. Thus, the wiring length of the phase adjuster 5d is longer by half the design communication wavelength than the wiring length of the second feeding wiring 5f from the point $M_4$ to a feeding point $C_{5B}$ (not illustrated) closest to the base end of the second feeding wiring 5f.

For example, in the example illustrated in FIG. 6A, the phase adjuster 5d is a rectangular wave-shaped line including a first line-shaped portion L1, a second line-shaped portion L2, a third line-shaped portion L3, a fourth line-shaped portion L4, and a fifth line-shaped portion L5.

The first line-shaped portion L1 is a straight line-shaped portion bent in the X-axis positive direction from the main body of the first feeding wiring 5e extending from the point $M_4$ in the Y-axis positive direction. The length of the first line-shaped portion L1 is denoted by d11.

The second line-shaped portion L2 is a straight line-shaped portion bent in the Y-axis positive direction from an end in the X-axis positive direction of the first line-shaped portion L1. The length of the second line-shaped portion L2 is denoted by d12.

The third line-shaped portion L3 is a straight line-shaped portion bent in the X-axis negative direction from an end in the Y-axis positive direction of the second line-shaped portion L2. The length of the third line-shaped portion L3 is denoted by d13. Note that d13>d11 holds for d13 since a rectangular waveform is formed. Furthermore, d13 needs to satisfy d13−d11<d4 since the phase adjuster 5d is separated from the third feeding wiring 5b in the X-axis direction.

The fourth line-shaped portion L4 is a straight line-shaped portion bent in the Y-axis positive direction from an end in the X-axis negative direction of the third line-shaped portion L3. The length of the fourth line-shaped portion L4 is denoted by d14.

The fifth line-shaped portion L5 is a straight line-shaped portion bent in the X-axis positive direction from an end in the Y-axis positive direction in the fourth line-shaped portion L4 and is connected to the main body of the first feeding wiring 5e. The length of the fifth line-shaped portion L5 is d15 (=d13−d11−$W_5$).

With such a configuration, the phase adjuster 5d is formed in the range of a width d12+d14+3×$W_5$ in the Y-axis direction. The wiring length corresponding to the phase difference adjusted by the phase adjuster 5d is derived from Δ=d11+d13+d15.

In the phase adjuster 5d, the fourth line-shaped portion L4 is a line-shaped portion that is the closest to the third feeding wiring 5b, and the direction of a signal current is opposite to that of the third feeding wiring 5b. Thus, it is necessary that the size H (=d4−d15−$W_5$) of the gap between the fourth line-shaped portion L4 and the third feeding wiring 5b be greater than or equal to a predetermined value $H_0$ so that the feeding efficiency does not decrease due to occurrence of coupling.

Furthermore, it is more preferable in the phase adjuster 5d that the distance from the axis O to the second line-shaped portion L2 and the distance from the axis O to the fourth line-shaped portion L4 be equal to each other.

As illustrated in FIG. 4C, impedance matchers 5c and 5a are formed at both ends of the third feeding wiring 5b. Hereinafter, in the third feeding wiring 5b, a portion having the line width $W_5$ excluding the impedance matchers 5c and 5a is referred to as the main body of the third feeding wiring 5b.

The impedance matcher 5c performs impedance matching between the impedance at the branch point of the branch line including the first feeding wiring 5e and the second feeding wiring 5f and the impedance of the third feeding wiring 5b.

The impedance matcher 5a performs impedance matching between the impedance of the connection path to an external circuit (not illustrated) and the impedance of the third feeding wiring 5b.

When the impedance of the main body of the third feeding wiring 5b is denoted by, for example, $Z_5$, the impedance at the branch point is $Z_5/2$. Thus, in the present embodiment, impedance matching is achieved by setting the line width $W_{5c}$ of the impedance matcher 5c to twice the line width $W_5$ of the main body of each of the first feeding wiring 5e and the second feeding wiring 5f.

The length of the impedance matcher 5c is equal to d4 in the example illustrated in FIG. 6A. However, the length of the impedance matcher 5c is more preferably a quarter effective wavelength of a design communication wave.

At the tip of the third feeding wiring 5b, the impedance changes as the line width changes from $W_5$ to $W_{5c}$.

According to an examination result, for example in a case where a frequency band used by the antenna device 100 is a 60 GHz band, if the amount of change in impedance in the portions where the line width changes in the impedance matcher 5c is less than or equal to 50Ω, a return loss due to current reflection at the branch point is preferably suppressed. Thus, a change in the impedance is more preferably less than or equal to 50Ω.

Furthermore, in order to make the change in impedance less than or equal to 50Ω, the impedance matcher 5c may be formed so as to be widened by two or more stages from the main body of the third feeding wiring 5b. In this case, it is more preferable that the amount of change in impedance at the widening stage closest to the terminal end in the longitudinal direction connected to the branch point be less than or equal to 30Ω.

As illustrated in FIG. 6B, on the base end side in the impedance matcher 5a, a first line-shaped portion A1 and a second line-shaped portion A2 are connected in the order mentioned from the base end side for impedance matching with a connection path with an external circuit (not illustrated).

The first line-shaped portion A1 has a line width of $W_{5a1}$ (where $W_{5a1} > W_5$) and a length of d21. Although d21 is not specifically limited, for example, it may be 1 mm.

The second line-shaped portion A2 has a line width of $W_{5a2}$ (where $W_5 < W_{5a2} < W_{5a1}$) and a length of d22. Although d22 is not specifically limited, for example, it may be 0.9 mm.

Also in the impedance matcher 5a, the change in impedance is more preferably less than or equal to 50Ω like in the impedance matcher 5c. In addition, since the impedance matcher 5a is widened by two stages from the main body of the third feeding wiring 5b, the amount of change in impedance at the widening stage closest to the base end (terminal end in the longitudinal direction) is more preferably less than or equal to 30Ω. The impedance matcher 5a may be formed so as to be widened by three or more stages from the main body of the third feeding wiring 5b toward the base end.

With such a configuration, a signal current supplied by the third feeding wiring 5b is equally divided at the branch point and separately supplied to the first feeding wiring 5e and the second feeding wiring 5f.

Each wiring-side feeding point $C_{5A}$ in the first feeding wiring 5e and each wiring-side feeding point $C_{5B}$ in the second feeding wiring 5f are formed at positions that are line-symmetric with respect to the symmetry axis that passes through the point $M_4$ and extends in the X-axis direction. However, since the above-described phase adjuster 5d is provided, the phases of the wiring-side feeding point $C_{5A}$ and the wiring-side feeding point $C_{5B}$ at line-symmetric positions are equal.

A numerical example of the feeding conductor 5 will be described.

The protruding amount ds at the tips of the first feeding wiring 5e and the second feeding wiring 5f is 0.75 mm.

The line width of each of the main bodies in the feeding conductor 5 is $W_5 = 0.1$ (mm).

Exemplary dimensions of the phase adjuster 5d for d11, d12, d13, d14, and d15 are 0.55 mm, 0.3 mm, 1.1 mm, 0.4 mm, and 0.45 mm, respectively. The wiring length Δ corresponding to the phase difference is 2.4 mm [=(0.55+0.1) mm+(1.1+0.1) mm+(0.45+0.1) mm].

In this case, the phase adjuster 5d forms a phase difference of a half-wavelength of 2.4 mm (180 degrees) of a 62.5 GHz communication wave.

A gap H between the fourth line-shaped portion L4 and the third feeding wiring 5b is 0.3 mm (=0.85 mm−0.45 mm−0.1 mm). In the case where the communication frequency is 62.5 GHz, $H_0$, which is a gap that allows for coupling between pieces of wiring, is 0.3 mm. Therefore, coupling can be prevented according to the gap H in this numerical example.

The impedance matcher 5c has a line width of $W_{5c} = 0.2$ (mm) and a length of d4=0.85 (mm). As a result, the impedance 120Ω of the main body of the third feeding wiring 5b decreases to 78Ω in the impedance matcher 5c, and the amount of change in impedance is 42Ω.

In the impedance matcher 5a, the line widths $W_{5a1}$ and $W_{5a2}$ are 0.38 mm and 0.2 mm, respectively. The lengths d21 and d22 are 1.0 mm and 0.9 mm, respectively. As a result, the impedance changes in two stages, such as 120Ω, 78Ω, and 50Ω, from the main body of the third feeding wiring 5b toward the base end (terminal end in the longitudinal direction) of the impedance matcher 5a.

The amount of change in the impedance at each stage is 42Ω and 28Ω.

The antenna device 100 having such a configuration is manufactured in the following manner, for example.

First, a conductor film is formed on each of the first surface 4a and the second surface 4b of the second dielectric layer 4, and then the ground conductor plate 3 and the feeding conductor layer 50 are each patterned by etching, for example. Then, the first dielectric layer 2, in which the dielectrics 2A, 2C, and 2E are bonded, is bonded onto the ground conductor plate 3. Thereafter, a conductor film is formed on the first surface 2a of the first dielectric layer 2, and the antenna array 10 is patterned by, for example, etching.

The first dielectric layer 2 and the ground conductor plate 3 may be bonded together after the antenna array 10 is patterned on the first dielectric layer 2.

Next, the antenna device 100 of the present embodiment will be described.

Figure 7:
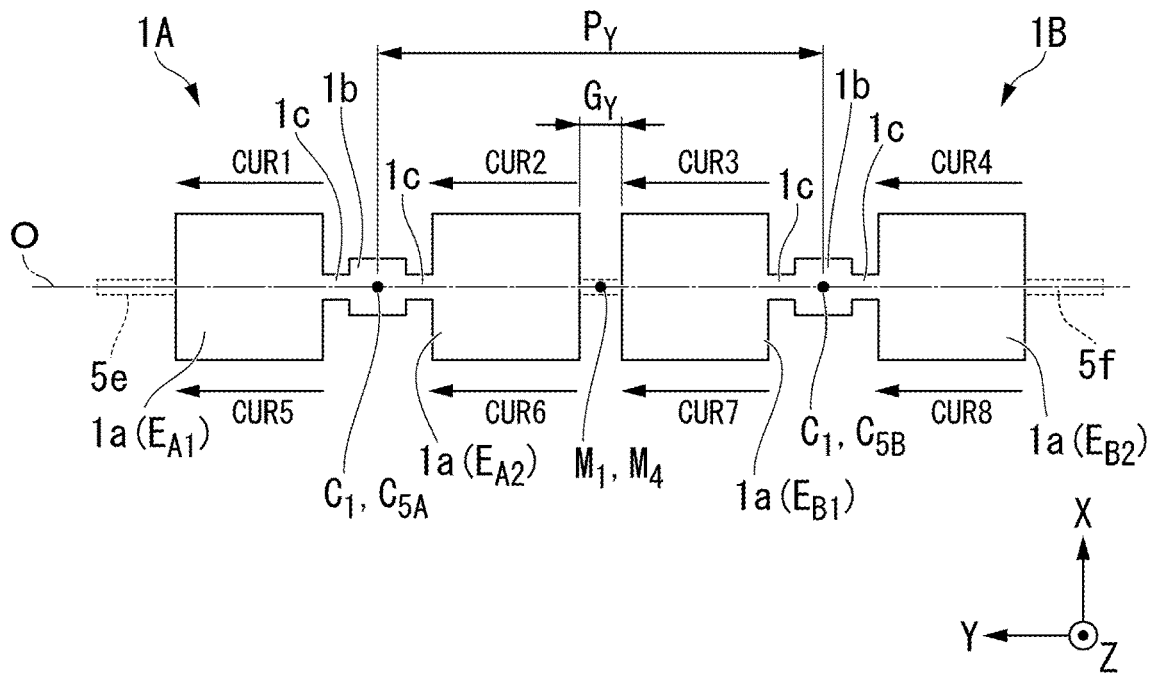
FIG. 7 is an explanatory diagram of the antenna device of the present embodiment.
Figure 8:
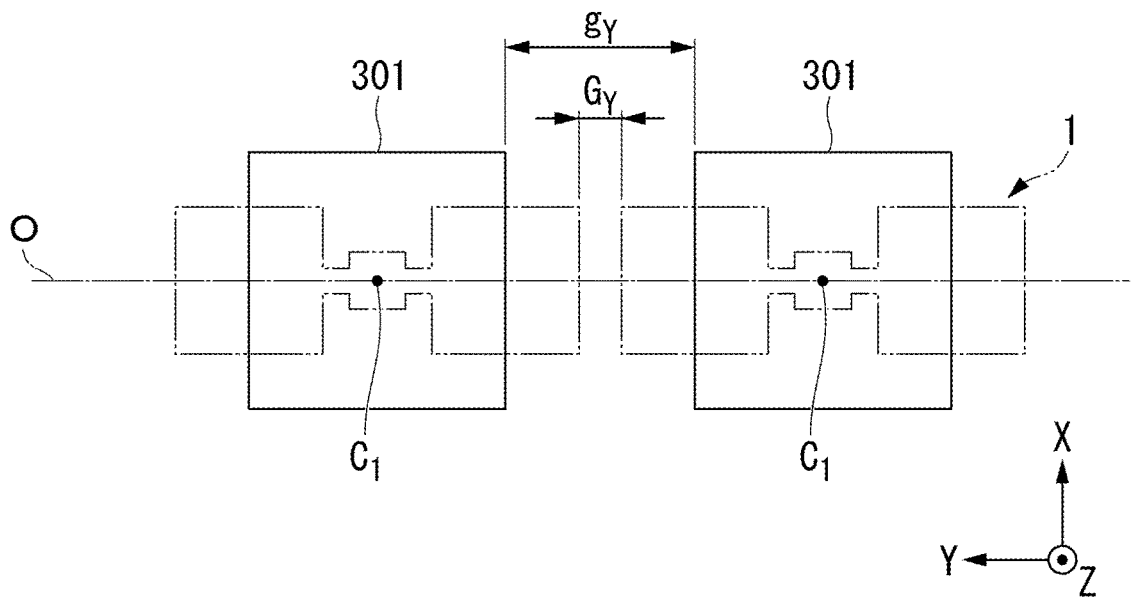
FIG. 8 is a schematic diagram illustrating an exemplary configuration of a second comparative example including rectangular patch antennas.

FIG. 7 is an explanatory diagram of the antenna device of the present embodiment. FIG. 8 is a schematic diagram illustrating an exemplary configuration of a comparative example including rectangular patch antennas.

In the antenna device 100 of the present embodiment, a signal from an external circuit (not illustrated) is fed to the third feeding wiring 5b of the feeding conductors 5 in the feeding conductor layer 50. When beam forming is performed, a signal supplied to the feeding conductors 5 is caused to have appropriate phase differences.

Since each piece of the third feeding wiring 5b includes an impedance matcher 5a at the base end, impedance matching is achieved with a connection path of an external circuit (not illustrated).

In this case, in the present embodiment, the line width of the impedance matcher 5a is reduced in two stages toward the main body of the third feeding wiring 5b, and the impedance increases stepwise. Thus, the return loss is reduced, and the feeding efficiency is improved. Particularly, in the case of the above numerical example, the amount of change in impedance at each stage is less than or equal to 50Ω, and the amount of change in impedance at the widening stage closest to the base end is less than or equal to 30Ω, so that the return loss is further reduced.

A signal current flowing through the third feeding wiring 5b branches into the first feeding wiring 5e and the second feeding wiring 5f at the tip of the third feeding wiring 5b. Since the third feeding wiring 5b is connected to the branch line via the impedance matcher 5c, impedance matching is achieved at the branch point. Particularly in the case of the above numerical example, since the amount of change in impedance is less than or equal to 50Ω, the return loss is further reduced.

The signal currents having been branched at the branch point have opposite phases in the first feeding wiring 5e and the second feeding wiring 5f. However, since the first feeding wiring 5e includes the phase adjuster 5d, a phase difference of 180 degrees is added on the main body of the first feeding wiring 5e on the tip side (Y-axis positive direction side) with respect to the phase adjuster 5d. Thus, the signal current in the main body of the first feeding wiring 5e on the tip side (Y-axis positive direction side) with respect to the phase adjuster 5d has the same phase as the signal current flowing through the second feeding wiring 5f.

Thus, the wiring-side feeding point $C_{5A}$ on the first feeding wiring 5e and the wiring-side feeding point $C_{5B}$ on the second feeding wiring 5f that are line-symmetrical with respect to the symmetry axis passing through the point $M_4$ and extending in the X-axis direction are each supplied with signal currents having the same phase.

A wiring-side feeding portion in the vicinity of each of the wiring-side feeding points $C_{5A}$ and $C_{5B}$ is electromagnetically coupled to an antenna-side feeding point $C_1$ of each electrode 1b on a patch antenna array 1Y through a slot 6 that is a signal passing portion facing in the Z-axis direction. As a result, signals having the same phase are fed to each electrode 1b by electromagnetic coupling.

Since an electromagnetic coupling feeding portion between each wiring-side feeding portion and each electrode 1b is impedance-matched by a slot 6, a feeding loss is reduced.

The signal current in the electrode 1b is branched into a radiation element 1a located in the Y-axis positive direction and a radiation element 1a located in the Y-axis negative direction through each piece of wiring 1c, and the branched signal currents are each radiated as electromagnetic waves.

Since the pitch $P_Y$ of the antenna-side feeding point is set appropriately in the present embodiment, the current direction flowing through each of the radiation elements 1a is substantially the same in the Y-axis direction.

In FIG. 7, current directions in the patch antenna 1 closest to the base end in the first antenna group 1A and the patch antenna 1 closest to the base end in the second antenna group 1B facing each other across the point $M_1$ are schematically illustrated.

For example, the patch antenna 1 closest to the base end in the first antenna group 1A includes a radiation element $E_{A1}$ which is a radiation element 1a on the Y-axis positive direction side, and a radiation element $E_{A2}$ which is a radiation element 1a on the Y-axis negative direction side. Assuming that the current direction in the radiation element $E_{A1}$ is the Y-axis positive direction as indicated by arrows CUR1 and CUR5, for example, the current direction in the radiation element $E_{A2}$ is Y-axis positive direction as indicated by arrows CUR2 and CUR6, for example, as described above.

The patch antenna 1 closest to the base end in the first antenna group 1B includes a radiation element $E_{B1}$ which is a radiation element 1a on the Y-axis positive direction side, and a radiation element $E_{B2}$ which is a radiation element 1a on the Y-axis negative direction side. Current directions of the radiation elements $E_{B1}$ and $E_{B2}$ being the same are similar to the case of the radiation elements $E_{A1}$ and $E_{A2}$. However, if the phase at the antenna-side feeding point $C_1$ is opposite, the current direction becomes the Y-axis negative direction.

However, since the first feeding wiring 5e includes the phase adjuster 5d, the phases of the antenna-side feeding points $C_1$ are in-phase also between the first antenna group 1A and the second antenna group 1B. Therefore, as illustrated in FIG. 7, the current direction in the radiation element $E_{B1}$ and the current direction in the radiation element $E_{B2}$ are both in the Y-axis positive direction as indicated by arrows CUR3 and CUR7 and arrows CUR4 and CUR8, respectively.

In this manner, even when power is supplied by the T-shaped branch line in the antenna device 100, it is possible to feed signal currents having the same phase to the patch antennas 1 of the first antenna group 1A and the patch antennas 1 of the second antenna group 1B and to cause the current directions in each of the radiation elements 1a to be aligned in substantially the same direction.

Thus, the maximum line length of the feeding wiring can be reduced to half or less as compared with a case where power is supplied to all the patch antennas 1 of a patch antenna array 1Y by linear feeding wiring that is fed from one end. As a result, a conductor loss is reduced to a half, and high gain is obtained in the present embodiment.

With the current directions in the respective radiation elements 1a being substantially the same in the Y-axis direction, a decrease in gain due to electromagnetic wave interference between adjacent patch antennas 1 can be suppressed. Thus, even if the gap $G_Y$ in the Y-axis direction between the radiation element $E_{A2}$ and the radiation element $E_{B1}$ becomes narrow, the gain does not decrease.

For example, in the above-described numerical example, the gap $G_Y$ is a minute gap such as 0.43 mm.

As described above, in the present embodiment, rectangular radiation elements 1a are connected by a divided circuit pattern 1d as a patch antenna 1. Therefore, space saving and reduction of size are possible as compared with a patch antenna formed in a rectangle, for example.

For example, exemplary arrangement of patch antennas 301 in an antenna device of a first comparative example is illustrated in FIG. 8.

The shape of a patch antenna 301 is, for example, a rectangle having a width in the X-axis direction of $W_{301X}$ and a width in the Y-axis direction of $W_{301Y}$. The patch antennas 301 are arranged at the array pitch $P_Y$ like in the present embodiment. An antenna-side feeding point $C_1$ in each of the patch antennas 301 is located at the center of each of the patch antennas 301.

In the patch antennas 301, it is necessary that the widths $W_{301X}$ and $W_{301Y}$ be predetermined values determined depending on the communication frequency. Therefore, in the case where the communication frequency is 60 GHz, $W_{301X}$ and $W_{301Y}$ are 2.24 mm and 2.24 mm, respectively, and a gap $g_Y$ in the Y-axis direction between the patch antennas 301 is 2.24 mm.

As described above, the patch antennas 301 have a larger gap in the Y-axis direction compared to the patch antennas 1 of the present embodiment, and it is also necessary that an array pitch $P_X$ in the X-axis direction be larger in order to array the patch antennas 301 in a lattice pattern. Thus, the size of the antenna device becomes large in the X-axis direction.

Next, the feeding conductors 5 will be described in comparison with a second comparative example.

Figure 9:
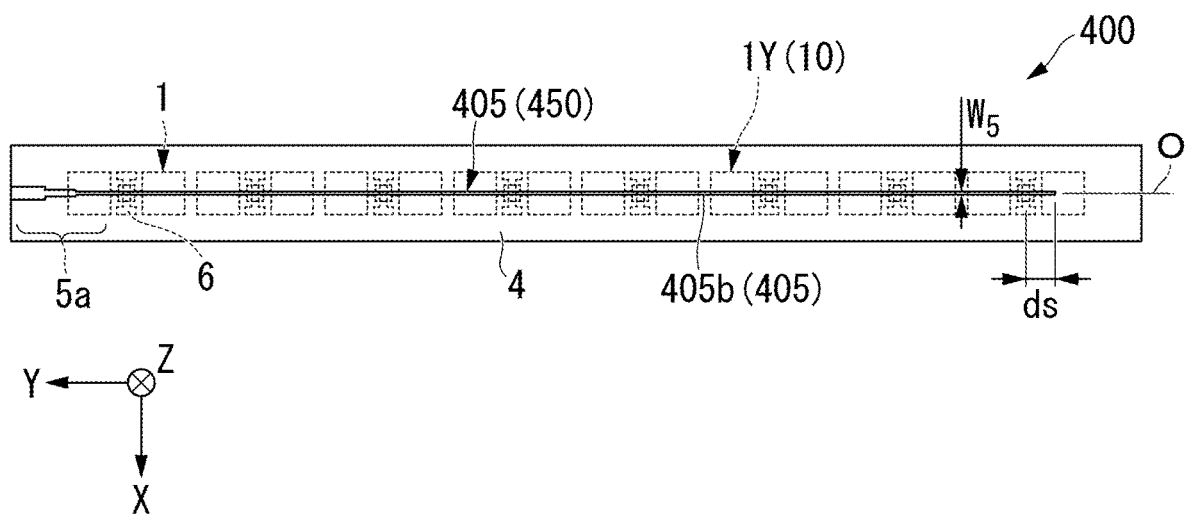
FIG. 9 is a schematic back view illustrating a configuration of a patch antenna array of an antenna device of the second comparative example.
Figure 10:
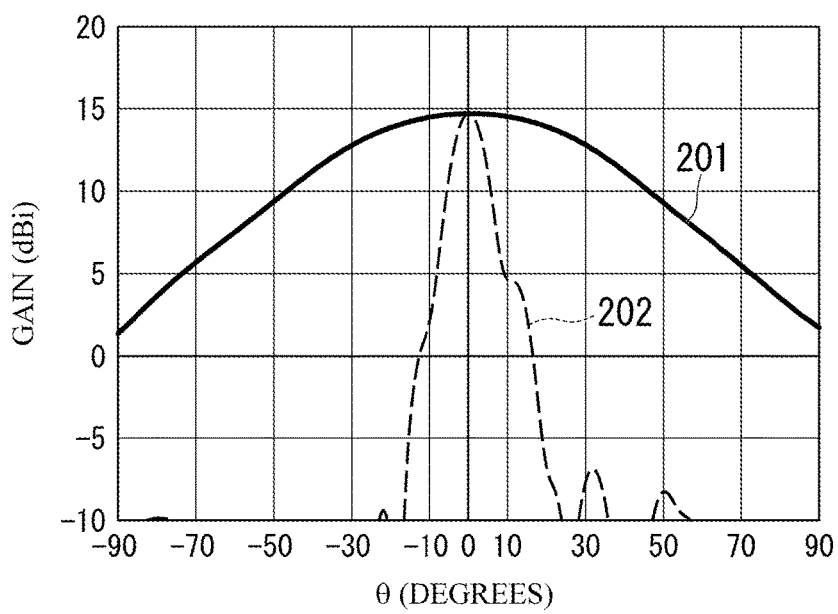
FIG. 10 is a graph illustrating a radiation pattern of a patch antenna array in an example of the antenna device of the present embodiment.
Figure 11:
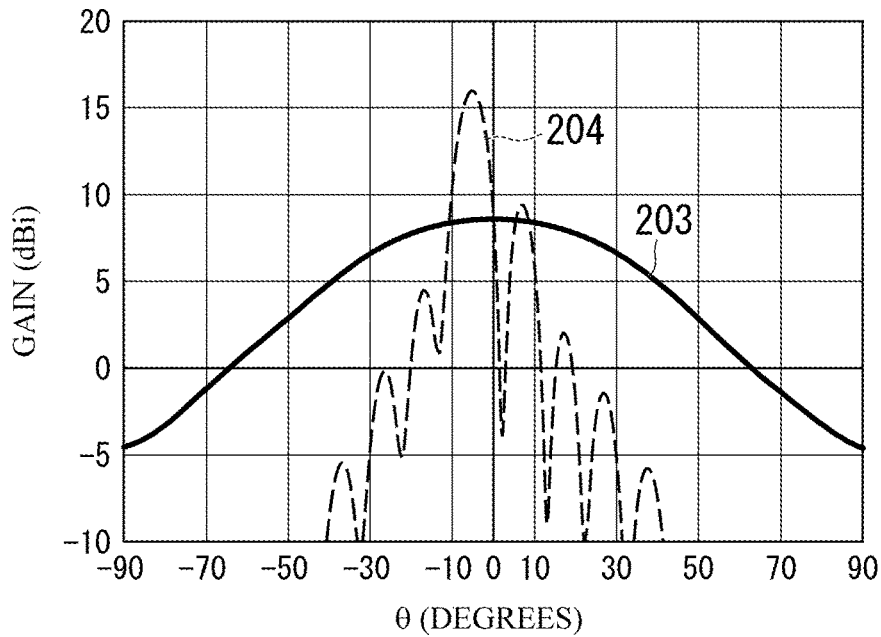
FIG. 11 is a graph illustrating a radiation pattern of the patch antenna array in the antenna device of the second comparative example.
Figure 12:
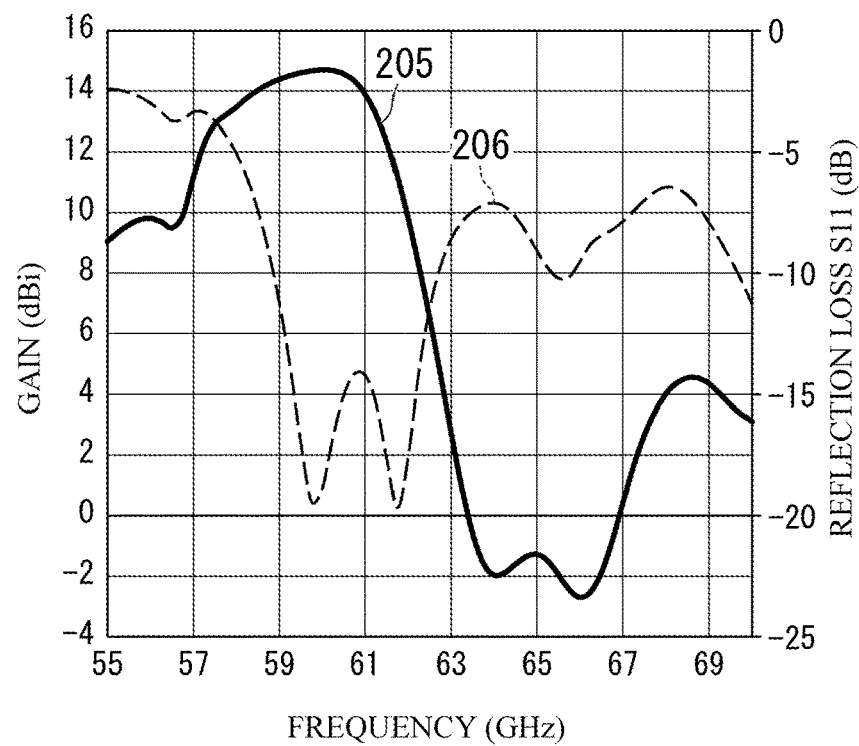
FIG. 12 is a graph illustrating frequency characteristics of gain and a reflection loss S11 in the patch antenna array of the antenna device of the example.
Figure 13:
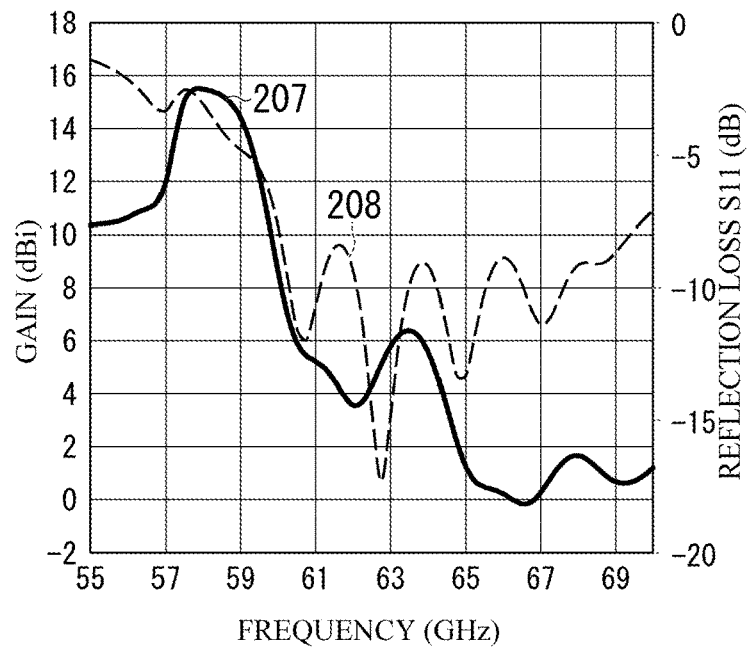
FIG. 13 is a graph illustrating frequency characteristics of gain and a reflection loss S11 in the patch antenna array of the antenna device of the comparative example.

FIG. 9 is a schematic back view illustrating a configuration of a patch antenna array of an antenna device of the second comparative example. FIG. 10 is a graph illustrating a radiation pattern of a patch antenna array of an example of the antenna device of the present embodiment. FIG. 11 is a graph illustrating a radiation pattern of the patch antenna array in the antenna device of the second comparative example. FIG. 12 is a graph illustrating frequency characteristics of gain and a reflection loss S11 in the patch antenna array of the antenna device of the example. FIG. 13 is a graph illustrating frequency characteristics of gain and a reflection loss S11 in the patch antenna array of the antenna device of the second comparative example.

As illustrated in FIG. 9, an antenna device 400 of the second comparative example includes a feeding conductor layer 450 instead of the feeding conductor layer 50 in the above embodiment. The feeding conductor layer 450 includes feeding conductors 405 instead of the feeding conductors 5 in the above embodiment.

Hereinafter, description will be given focusing on differences from the above embodiment.

A feeding conductor 405 includes line-shaped feeding wiring 405b extending along the axis O corresponding to a patch antenna array 1Y. The line width of the feeding wiring 405b is equal to a line width $W_5$ in each of the main bodies of the feeding conductors 5. The protruding amount from a slot 6 at the end (tip) on the Y-axis negative direction side of the feeding wiring 405b is equal to the protruding amount ds in the above embodiment.

An impedance matcher 5a similar to that in the above embodiment is formed at the end (base end) on the Y-axis positive direction side of the feeding wiring 405b. Thus, the feeding wiring 405b can be electrically coupled to an external circuit (not illustrated) via a connection path having a predetermined impedance.

The feeding conductor 405 can perform electromagnetic coupling feeding to eight patch antennas 1 included in the patch antenna array 1Y from the positions of wiring-side feeding points at similar positions to the above embodiment. However, since the feeding wiring 405b is not branched halfway, the wiring lengths in the feeding paths to each of the patch antennas 1 are different for each of the patch antennas 1. Since the array pitch of antenna-side feeding points is $P_Y$ like in the above embodiment, the phases of signal currents in two radiation elements 1a connected by a divided circuit pattern 1d are equal to each other.

According to the configuration of the second comparative example as described above, electromagnetic radiation can be performed depending on the signal current like in the above embodiment except that the wiring length of the feeding path in the four patch antennas 1 located at the tip of the feeding conductor 405 is increased.

The radiation characteristics of patch antenna arrays in the antenna device 100 of the example based on the numerical example described above and the antenna device 400 of the second comparative example were simulated.

Radiation patterns of the example and the second comparative example are illustrated in the graphs of FIGS. 10 and 11, respectively.

In FIGS. 10 and 11, the horizontal axis represents the elevation angle θ (degrees), and the vertical axis represents the gain (dBi). In FIGS. 10 and 11, solid lines (curves 201 and 203) represent the total gain on the XZ plane in the case of a frequency of 60 GHz, and broken lines (curves 202 and 204) represent the total gain on the YZ plane. The XZ plane is an electrical plane (E plane), and the YZ plane is a magnetic plane (H plane).

Comparing the curves 201 and 203, the gain on the XZ plane of the example was about 6 dB higher than the gain of the second comparative example at θ=0 (degrees). The gain at other elevation angles was substantially the same.

When the curves 202 and 204 are compared, the gain on the YZ plane of the example illustrated substantially no side lobes, whereas side lobes were remarkable in the comparative example. Moreover, in the comparative example, the maximum gain deviates from θ=0 (degrees).

The frequency characteristics of the gain and the reflection loss S11 in the example and the second comparative example are illustrated in the graphs of FIGS. 12 and 13, respectively.

In FIGS. 12 and 13, the horizontal axis represents the frequency (GHz) and the vertical axis represents gain (dBi) on the left axis and the reflection loss S11 (dB) on the right axis. In FIGS. 12 and 13, solid lines (curves 205 and 207) represent the total gain, and broken lines (curves 206 and 208) represent the reflection loss S11.

As illustrated by the curve 205, the total gain of the example was at or higher than a permissible level of 10 dBi between 57.5 GHz and 62 GHz. On the other hand, the range in which the total gain of the second comparative example is higher than or equal to 10 dBi was much narrower as indicated by the curve 207, such as from 57.5 GHz to 60 GHz. In the second comparative example in particular, the total gain is below the permissible level at the communication wavelength of 60 GHz and above.

As illustrated by the curve 206, the reflection loss S11 of the example was at or below the permissible level of −10 dB between about 58.8 GHz and about 62.6 GHz. On the other hand, the range in which the reflection loss S11 of the second comparative example is less than or equal to −10 dBi was much narrower as indicated by the curve 208, such as from 60.3 GHz to 61.0 GHz.

As described above, in the patch antenna array of the antenna device 100 of the example, much better radiation characteristics (gain, side lobes) are obtained as compared with the antenna device 400 of the second comparative example, and frequency characteristics of the total gain and the reflection loss S11 were also excellent. This is because the wiring length is suppressed since the feeding conductor 5 is branch wiring in the example, and thus the conductor loss is further reduced, whereas the wiring length becomes longer and the conductor loss becomes larger toward the tip of the feeding conductor 405 in the second comparative example.

Next, antenna characteristics of the antenna device 100 will be described on the basis of the simulation results based on the above numerical examples.

Figure 14:
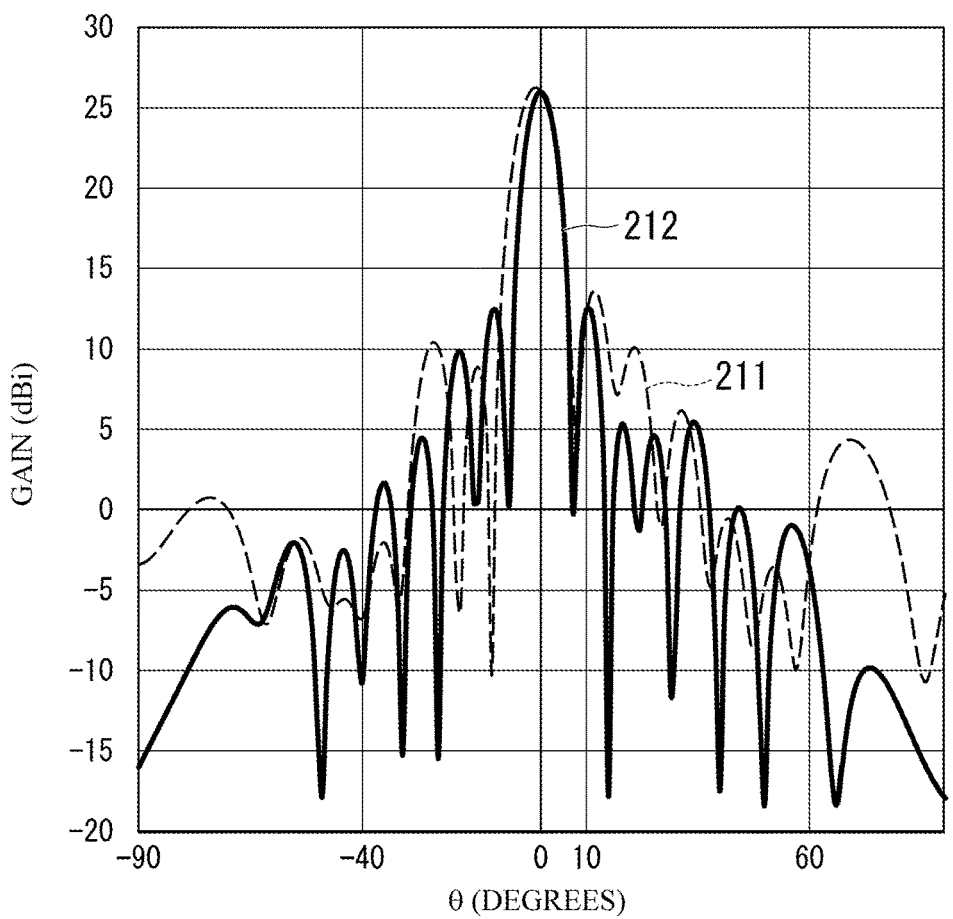
FIG. 14 is a graph illustrating the total gain in the antenna device of the example.
Figure 15:
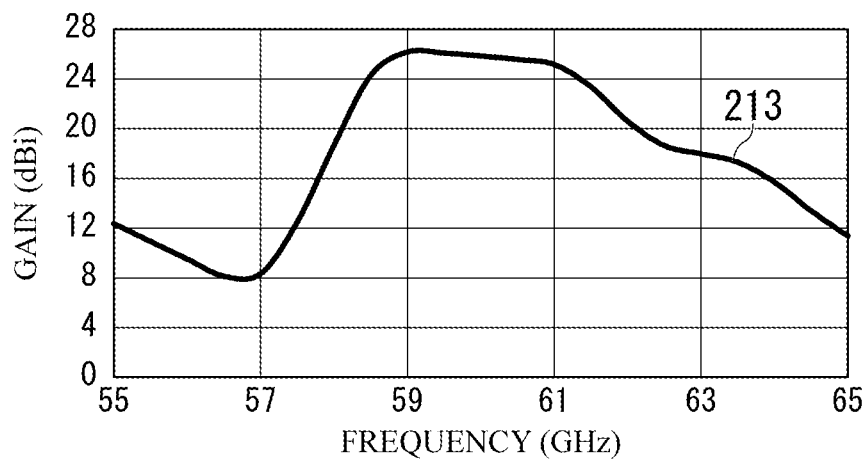
FIG. 15 is a graph illustrating frequency characteristics of the maximum gain in the antenna device of the example.
Figure 16:
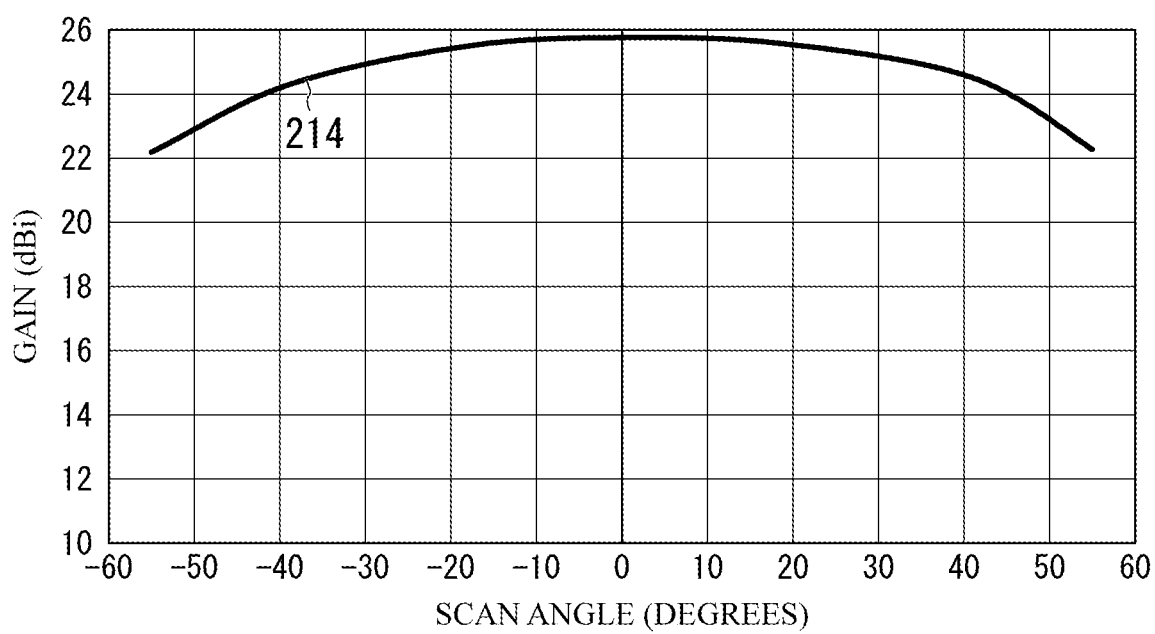
FIG. 16 is a graph illustrating scan angle characteristics of the maximum gain in the antenna device of the example.

FIG. 14 is a graph illustrating the total gain in the antenna device of the example. FIG. 15 is a graph illustrating frequency characteristics of the maximum gain in the antenna device of the example. FIG. 16 is a graph illustrating scan angle characteristics of the maximum gain in the antenna device of the example.

In FIG. 14, the total gain of the antenna device 100 is illustrated. Note that the frequency is 58.5 GHz. In FIG. 14, the horizontal axis represents the elevation angle θ (degrees), and the vertical axis represents the gain (dBi). In FIG. 14, a broken line (curve 211) represents the total gain on the XZ plane, and a solid line (curve 212) represents the total gain on the YZ plane. The XZ plane is an electrical plane (E plane), and the YZ plane is a magnetic plane (H plane).

As illustrated by the curves 211 and 212 in FIG. 14, good total gain of greater than or equal to 25 dBi is obtained on both the XZ plane and the YZ plane in the antenna device 100.

In FIG. 15, frequency characteristics of the maximum gain of the antenna device 100 are illustrated. In FIG. 15, the horizontal axis represents the frequency (GHz), and the vertical axis represents the gain (dBi).

As indicated by a curve 213 in FIG. 15, good maximum gain of greater than or equal to 23 dBi was obtained in the antenna device 100 between about 58.4 GHz and about 61.5 GHz.

FIG. 16 illustrates the relationship between the scan angle and the maximum gain in a case where beam forming is performed by the antenna device 100. Note that the frequency is 60 GHz. In FIG. 16, the horizontal axis represents the scan angle (degrees), and the vertical axis represents the gain (dBi).

As indicated by a curve 214 in FIG. 16, good maximum gain of greater than or equal to 23 dBi was obtained in the antenna device 100 between about −50 degrees and about +51 degrees. In particular, when the scan angle was 0 degrees, the maximum gain was about 25.8 dBi.

In the antenna device 100, as described above, the maximum gain when the scan angle is 0 degrees is improved. Therefore, even when the absolute value of the scan angle increases and the maximum gain decreases according to the cosine law, good maximum gain was obtained in the range of about ±50 degrees.

As described above, according to the antenna device 100 of the present embodiment, high gain suitable for beam forming can be obtained and the size can be reduced.

(Modification)

Next, an antenna device according to a modification of the above embodiment will be described.

Figure 17:
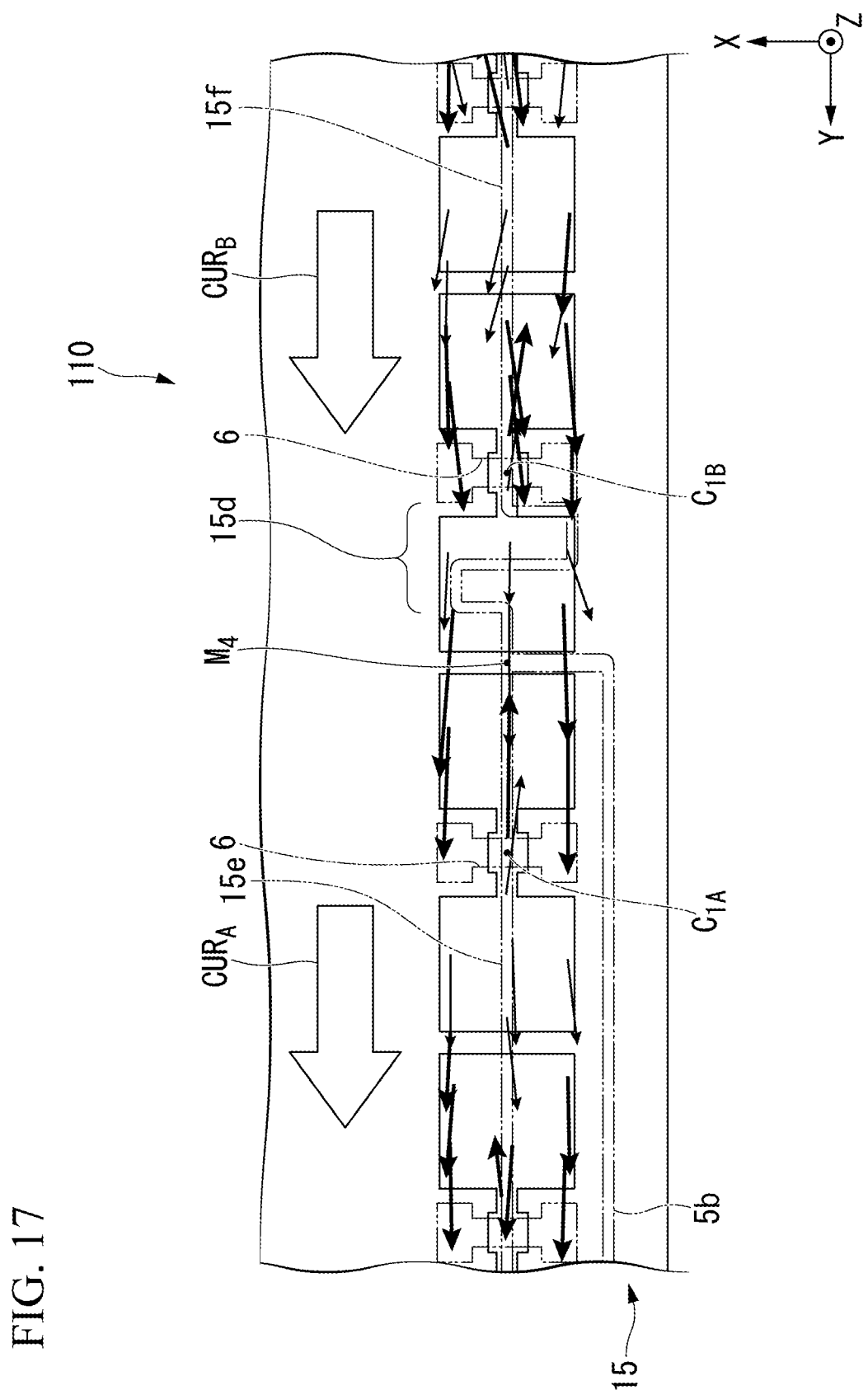
FIG. 17 is a schematic diagram illustrating a configuration of the main part of an antenna device of a modification of the present embodiment and a simulation result of the current direction.

FIG. 17 is a schematic diagram illustrating a configuration of the main part of the antenna device of the modification of the present embodiment and a simulation result of the current direction.

As illustrated in the configuration of the main part in FIG. 17, an antenna device 110 of the present modification includes a feeding conductor 15 instead of the feeding conductor 5 of the above embodiment.

Hereinafter, description will be given focusing on differences from the above embodiment.

The feeding conductor 15 includes first feeding wiring 15e, second feeding wiring 15f, and a phase adjuster 15d instead of the first feeding wiring 5e, the second feeding wiring 5f, and the phase adjuster 5d in the feeding conductor 5.

The first feeding wiring 15e is a line-shaped wiring extending in the Y-axis direction in which the phase adjuster 5d is removed from the first feeding wiring 5e.

The second feeding wiring 15f includes the phase adjuster 15d at the base end of the second feeding wiring 5f. Specifically, the phase adjuster 15d of the present modification is formed between a point $M_4$ and a slot 6 closest to the base end among slots 6 overlapping the second feeding wiring 15f in a plan view.

The phase adjuster 15d is obtained by inverting the phase adjuster 5d of the above embodiment in the Y-axis direction.

As described above, the present modification is an example in which the phase adjuster 15d is not parallel with the third feeding wiring 5b since the phase adjuster 15d is provided at the base end of the second feeding wiring 15f.

In the present modification, since the phase adjuster 15d is provided at the base end of the second feeding wiring 15f, the phases of signal currents at a wiring-side feeding point $C_{1A}$ in the first feeding wiring 15e and a wiring-side feeding point $C_{1B}$ in the second feeding wiring 15f, which are located at line-symmetric positions with respect to the symmetry axis that passes through the point $M_4$ and extends in the X-axis direction, are in-phase like in the above-described embodiment. Thus, the current direction in each radiation element 1a is substantially the same in the Y-axis direction like in the above embodiment.

In FIG. 17, a simulation result of the current direction in patch antennas 1 of a patch antenna array 1Y of the antenna device 110 is indicated by solid arrows.

As illustrated in FIG. 17, the direction of current in the Y-axis direction is substantially the same in each of the radiation elements 1a like in the above embodiment. Therefore, as indicated by white arrows $CUR_A$ and $CUR_B$, the current directions as a whole in a first antenna group 1A and a second antenna group 1B are also the same.

For this reason, according to the antenna device 110 of the present modification, as in the first embodiment, high gain suitable for beam forming can be obtained and the size can be reduced.

In particular, in the present modification, since the phase adjuster 15d is not arranged in parallel with the third feeding wiring 5b, there are fewer design restrictions than the phase adjuster 5d in the above embodiment. Therefore, although the case in which the phase adjuster 15d is line-symmetrical with the phase adjuster 5d has been described in the present modification, the shape of the phase adjuster 15d is not limited to this as long as a phase difference of 180 degrees can be formed.

In addition, in the present modification, the phase adjuster 15d is separated from the third feeding wiring 5b as compared with the above embodiment, and thus the coupling between the third feeding wiring 5b and the phase adjuster 15d is less likely to be generated.

In the description of the above embodiment and modification, the exemplary cases in which the radiation elements 1a are rectangular have been described. However, the shape of the radiation elements in the present invention is not limited to a rectangle. For example, the shape of the radiation elements in the present invention may be a polygon other than a rectangle, a circle, or another shape.

In the above embodiment and modification, the exemplary cases in which eight patch antennas 1 are arranged in a patch antenna array 1Y and sixteen patch antenna arrays 1Y are included have been described. However, in the antenna device of the present invention, the number of patch antennas in a patch antenna array is only required to be an even number, and is not limited to eight. In addition, the number of patch antenna arrays is not limited to 16 either, and may be appropriately increased or decreased.

As mentioned above, although the preferable embodiments, the modification, and the example of the present invention have been described, the present invention is not limited to these embodiments, the modification, or the example. Additions, omissions, substitutions, and other modifications can be made within a scope not departing from the spirit of the present invention.

Moreover, the present invention is not limited by the above description, and is limited only by the appended claims.

DESCRIPTION OF THE REFERENCE SYMBOLS

1: Patch antenna
1a, $E_{A1}$, $E_{A2}$, $E_{B1}$, $E_{B2}$: Radiation element
1b: Electrode
1c: Wiring
1d: Divided circuit pattern
1A: First antenna group
1B: Second antenna group
1Y: Patch antenna array
2: First dielectric layer
2a: First surface (first surface)
2b: Second surface (second surface)
3: Ground conductor plate
4: Second dielectric layer
5, 15: Feeding conductor
5a, 5c: Impedance matcher
5b: Third feeding wiring
5d, 15d: Phase adjuster
5e, 15e: First feeding wiring
5f, 15f: Second feeding wiring
6: Slot
10: Antenna array
100, 110: Antenna device
O: Axis

The invention claimed is:

1. An antenna device comprising:
a first dielectric layer;
an antenna array arranged on a first surface of the first dielectric layer, the antenna array comprising a plurality of patch antenna arrays arrayed in a direction intersecting a first direction, the plurality of patch antenna arrays each comprising a plurality of patch antennas arrayed in alignment in the first direction;
a ground conductor plate arranged on a second surface opposite to the first surface in the first dielectric layer, the ground conductor plate formed with slots forming non-conductive portions at positions facing the patch antennas;
a second dielectric layer secured to the ground conductor plate so as to face the first dielectric layer with the ground conductor plate sandwiched therebetween; and
line-shaped feeding conductors which perform electromagnetic coupling feeding on each of the patch antennas in the patch antenna arrays from wiring-side feeding portions formed at positions intersecting with each of the slots when viewed from a normal direction of the first surface, the feeding conductors formed on the second dielectric layer so as to face the ground conductor plate with the second dielectric layer sandwiched therebetween and each arranged to face one of the patch antenna arrays,
wherein each of the patch antennas comprises:
two radiation elements spaced apart from each other in the first direction;
an electrode arranged so as to face the wiring-side feeding portion between the two radiation elements, the electrode enabling electromagnetic coupling feeding from the wiring-side feeding portion; and
wiring which electrically couples the electrode and each of the two radiation elements in the first direction, and
wherein each of the feeding conductors further comprises:
first feeding wiring extending in a first feeding direction in the first direction from a center of the patch antenna array in the first direction when viewed from the normal direction;
second feeding wiring connected to a first base end of the first feeding wiring, the second feeding wiring extending in a direction opposite to the first feeding wiring from the first base end of the first feeding wiring;
third feeding wiring electrically coupled to a connection portion of the first feeding wiring and the second feeding wiring, the third feeding wiring arranged in parallel with the first feeding wiring or the second feeding wiring; and
a phase adjuster which forms a phase difference of 180 degrees between a phase of each of the wiring-side feeding portions in the first feeding wiring and a phase of each of the wiring-side feeding portions in the second feeding wiring, the phase adjuster formed between the connection portion and the wiring-side feeding portion located closest to the first base end of the first feeding wiring or a second base end of the second feeding wiring.

2. The antenna device according to claim 1, wherein the phase adjuster is formed in a waveform pattern centered on a central axis of the first feeding wiring or the second feeding wiring in which the phase adjuster is formed.

3. The antenna device according to claim 1, wherein the third feeding wiring comprises an impedance matcher having a line width widened by two or more stages toward a terminal end at an end in a longitudinal direction.

4. The antenna device according to claim 3, wherein, in the impedance matcher, a change in impedance between adjacent stages is less than or equal to 50Ω, and a change in impedance of a widening stage closest to the terminal end is less than or equal to 30Ω.

5. The antenna device according to claim 1, wherein the phase adjuster has a shape of a waveform.

* * * * *